United States Patent
Santos et al.

(10) Patent No.: US 10,748,318 B2
(45) Date of Patent: Aug. 18, 2020

(54) SYSTEM AND METHOD OF SCANNING AND EDITING TWO DIMENSIONAL FLOORPLANS

(71) Applicant: FARO Technologies, Inc., Lake Mary, FL (US)

(72) Inventors: João Santos, Korntal-Münchingen (DE); Ahmad Ramadneh, Kornwestheim (DE); Aleksej Frank, Stuttgart (DE); Oliver Zweigle, Stuttgart (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 16/561,533

(22) Filed: Sep. 5, 2019

(65) Prior Publication Data
US 2019/0392622 A1 Dec. 26, 2019

Related U.S. Application Data

(63) Continuation of application No. 15/911,956, filed on Mar. 5, 2018, now Pat. No. 10,445,913.

(51) Int. Cl.
*G06T 11/60* (2006.01)
*G06T 7/521* (2017.01)
(Continued)

(52) U.S. Cl.
CPC ............ *G06T 11/60* (2013.01); *G01C 15/002* (2013.01); *G01S 7/4808* (2013.01); *G01S 17/42* (2013.01);
(Continued)

(58) Field of Classification Search
CPC . G06T 11/60; G06T 7/11; G06T 7/521; G06T 2207/10028; G01S 17/86; G01C 15/002
See application file for complete search history.

(56) References Cited

U.S. PATENT DOCUMENTS 8,023,727 B2 * 9/2011 Matsumoto ........ G06K 9/00691
382/153
8,705,016 B2 4/2014 Schumann et al.
(Continued)

OTHER PUBLICATIONS

European Search Report for Application No. 19159284.9 dated Aug. 14, 2019; 9 pgs.
(Continued)

*Primary Examiner* — Ryan R Yang
(74) *Attorney, Agent, or Firm* — Cantor Colburn LLP

(57) ABSTRACT

A system and method of generating a two-dimensional (2D) image of an environment is provided. The system includes a 2D scanner having a controller that determines a distance value to at least one of the object points. One or more processors are operably coupled to the 2D scanner, the one or more processors being responsive to nontransitory executable instructions for generating a plurality of 2D submaps of the environment based at least in part on the distance value, each submap generated from a different point in the environment. A map editor is provided that is configured to: select a subset of submaps from the plurality of 2D submaps; and generate the 2D image of the environment using the subset of 2D submaps. The method provides for realigning of 2D submaps to improve the quality of a global 2D map.

19 Claims, 31 Drawing Sheets

(51) Int. Cl.
  *G01C 15/00* (2006.01)
  *G06T 3/00* (2006.01)
  *G01S 17/42* (2006.01)
  *G01S 17/89* (2020.01)
  *G01S 7/48* (2006.01)
  *G01S 17/86* (2020.01)

(52) U.S. Cl.
  CPC .............. *G01S 17/86* (2020.01); *G01S 17/89* (2013.01); *G06T 3/0075* (2013.01); *G06T 7/521* (2017.01); *G06T 2207/10028* (2013.01)

(56) References Cited

U.S. PATENT DOCUMENTS

| | | |
|---|---|---|
| 8,773,946 B2 | 7/2014 | Padmanabhan et al. |
| 2013/0169668 A1 | 7/2013 | Lynch |
| 2013/0314688 A1 | 11/2013 | Likholyot |
| 2015/0286868 A1* | 10/2015 | Flores ................ G06K 9/00651 382/103 |
| 2016/0047914 A1 | 2/2016 | Zweigle et al. |
| 2016/0209846 A1* | 7/2016 | Eustice ................ G05D 1/0246 |
| 2017/0169604 A1 | 6/2017 | Van Der Zwan et al. |
| 2018/0005035 A1 | 1/2018 | Bogolea et al. |
| 2018/0315162 A1 | 11/2018 | Sturm |

OTHER PUBLICATIONS

Gebre, et al. "Remotely Operated and Autonomous Mapping System (ROAMS)." Technologies for Practical Robot Applications, 2009. Tepra 2009. IEEE International Conference on IEEE, Piscataway, NJ, USA. Nov. 9, 2009, pp. 173-178.

* cited by examiner ed herein # SYSTEM AND METHOD OF SCANNING AND EDITING TWO DIMENSIONAL FLOORPLANS

CROSS REFERENCE TO RELATED APPLICATIONS

This present application is a continuation application of U.S. patent application Ser. No. 15/911,956, filed Mar. 5, 2018, the entire disclosure of which is incorporated herein by reference.

BACKGROUND

The present application is directed to a system that optically scans an environment, such as a building, and in particular to a portable system that generates two-dimensional floorplans of the scanned environment and facilitates editing the two-dimensional map without mapping the environment again.

The automated creation of digital two-dimensional floorplans for existing structures is desirable as it allows the size and shape of the environment to be used in many processes. For example, a floorplan may be desirable to allow construction drawings to be prepared during a renovation. Such floorplans may find other uses such as in documenting a building for a fire department or to document a crime scene, in the planning of construction or remodeling of a building, and the like.

Existing measurement systems typically use a scanning device that determines coordinates of surfaces in the environment by either emitting a light and capturing a reflection to determine a distance or by triangulation using cameras. These scanning device are mounted to a movable structure, such as a cart, and moved through the building to generate a digital representation of the building. These systems tend to be more complex and require specialized personnel to perform the scan. Further, the scanning equipment including the movable structure may be bulky, which could further delay the scanning process in time sensitive situations, such as a crime or accident scene investigation.

Further, issues sometimes arise during the scanning process that results in errors in a map. These errors may be due to a mis-registration of newly acquired data with an earlier data set. These mis-registrations may occur for example when a natural feature in the environment used by the system for registration is moved. Other errors may occur due to ambiguities in the data set.

Accordingly, while existing scanners are suitable for their intended purposes, what is needed is a system for having certain features of embodiments of the present invention.

BRIEF DESCRIPTION

According to one aspect of the invention, a system of generating a two-dimensional (2D) image of an environment is provided. The system includes a 2D scanner having a controller that determines a distance value to at least one of the object points. One or more processors are operably coupled to the 2D scanner, the one or more processors being responsive to nontransitory executable instructions for generating a plurality of 2D submaps of the environment based at least in part on the distance value, each submap generated from a different point in the environment. A map editor is provided that is configured to: select a subset of submaps from the plurality of 2D submaps; and generate the 2D image of the environment using the subset of 2D submaps.

In addition to one or more of the features described herein, or as an alternative, further embodiments of the system may include the map editor being further configured to: select a first submap from the subset of submaps; edit the first submap; and generate a revised 2D image of the environment using the edited first submap. In addition to one or more of the features described herein, or as an alternative, further embodiments of the system may include the editing comprising at least one from a group of rotation and translation. In addition to one or more of the features described herein, or as an alternative, further embodiments of the system may include the editing comprising aligning the first submap to the 2D image of the environment, the alignment comprising: performing by an operator at least one of a shift or a rotation of the first submap relative to the 2D image; identifying overlapping natural features in the 2D image and the first submap; and automatically shifting and rotating the first submap to align with the 2D image when the overlapping natural features are aligned by the operator within a predetermined threshold.

In addition to one or more of the features described herein, or as an alternative, further embodiments of the system may include the map editor being further configured to: select a first submap from the subset of submaps; delete the first submap; and generate a revised 2D image of the environment using the subset of submaps, without the first submap. In addition to one or more of the features described herein, or as an alternative, further embodiments of the system may include the map editor being further configured to: add a new submap to the subset of submaps; and generate a revised 2D image of the environment using the subset of submaps, with the new submap. In addition to one or more of the features described herein, or as an alternative, further embodiments of the system may include the map editor being further configured to save a copy of the revised 2D image of the environment separate from the 2D image of the environment. In addition to one or more of the features described herein, or as an alternative, further embodiments of the system may include the revised 2D image of the environment is for a subset of regions from the 2D image of the environment.

According to another aspect of the invention, a method of generating a two-dimensional (2D) image of an environment is provided. The method comprises moving a 2D measurement device through an environment to acquire a predetermined amount of coordinate data. A plurality of submaps are generated in response to each acquisition of the predetermined amount of coordinate data, the plurality of submaps including a first submap, a second submap and a third submap. An error is determined in the registration of the second submap and in response performing a correction method comprising: identifying the first submap has correctly registered data; bifurcating the second submap from the first submap and the second submap; aligning the second submap with the first submap and third submap; and generating a 2D map of a scanned environment.

In addition to one or more of the features described herein, or as an alternative, further embodiments of the method may include identifying of the error in registration is based at least in part on a visual identification by the operator. In addition to one or more of the features described herein, or as an alternative, further embodiments of the method may include the identifying of the error in registration is based at least in part on a comparison of the plurality of submaps with a previous 2D map of the environment. In addition to one or more of the features described herein, or as an alternative, further embodiments of the method may include the identifying of the error in registration is based at least in part on a comparison of the plurality of submaps with a design layout drawing.

In addition to one or more of the features described herein, or as an alternative, further embodiments of the method may include the aligning of the second submap includes deleting the second submap and aligning the first submap to the third submap. In addition to one or more of the features described herein, or as an alternative, further embodiments of the method may include the aligning of the second submap includes deleting the second submap and replacing it with a fourth submap that covers an area of the environment covered by the second submap. In addition to one or more of the features described herein, or as an alternative, further embodiments of the method may include the aligning of the second submap includes deleting the second submap and replacing it with a fourth submap that was previously generated and covers an area of the environment covered by the second submap.

In addition to one or more of the features described herein, or as an alternative, further embodiments of the method may include the aligning of the second submap includes the operator manually aligning the second submap with the first submap and the third submap. In addition to one or more of the features described herein, or as an alternative, further embodiments of the method may include the aligning of the second submap is based at least in part on aligning natural features located within the environment.

In addition to one or more of the features described herein, or as an alternative, further embodiments of the method may include the aligning of the second submap is performed automatically by line matching within a predetermined probability threshold. In addition to one or more of the features described herein, or as an alternative, further embodiments of the method may include the automatic alignment is an iterative closest point matching.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

The present invention relates to a device that includes a system having a 2D scanner that works cooperatively with an inertial measurement unit to generate a two-dimensional map of an environment.

Figure 1:
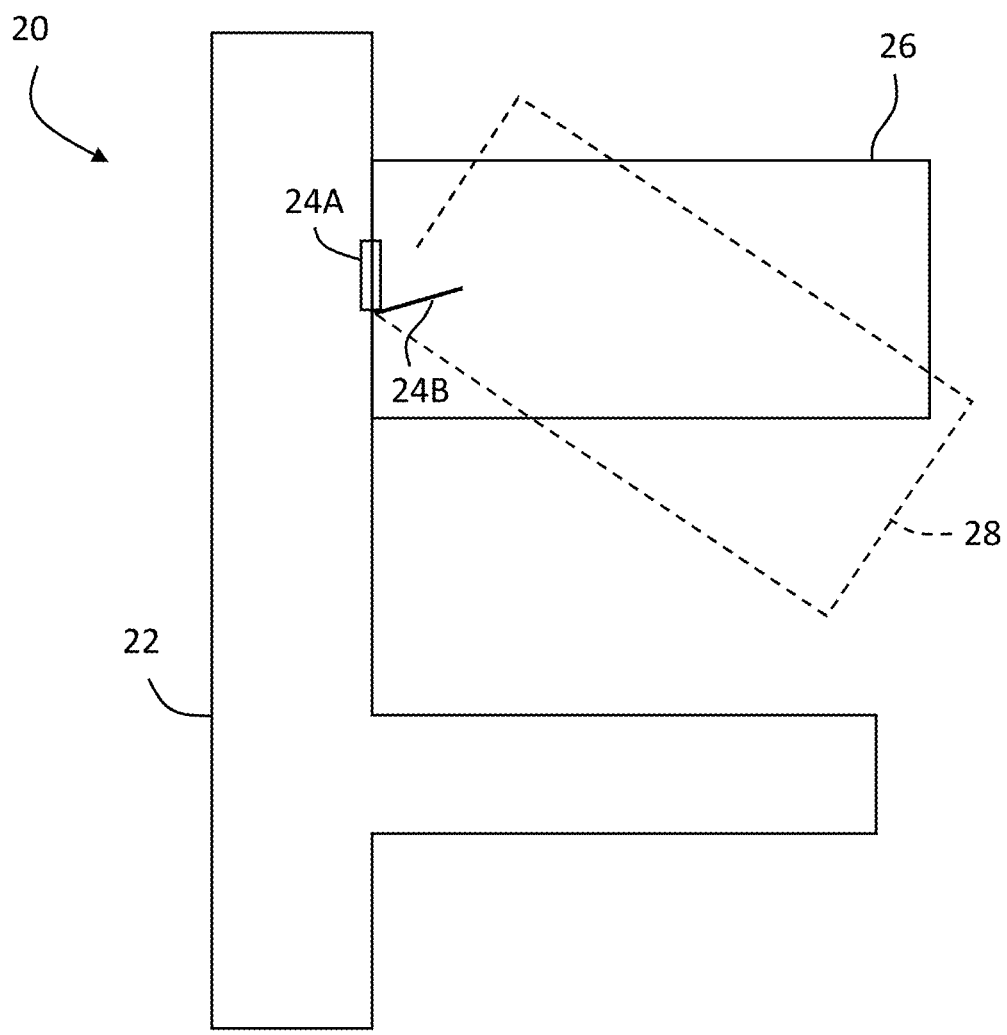
FIG. 1 is an illustration of a two-dimensional map of an area generated by a mapping system.
Figure 2:
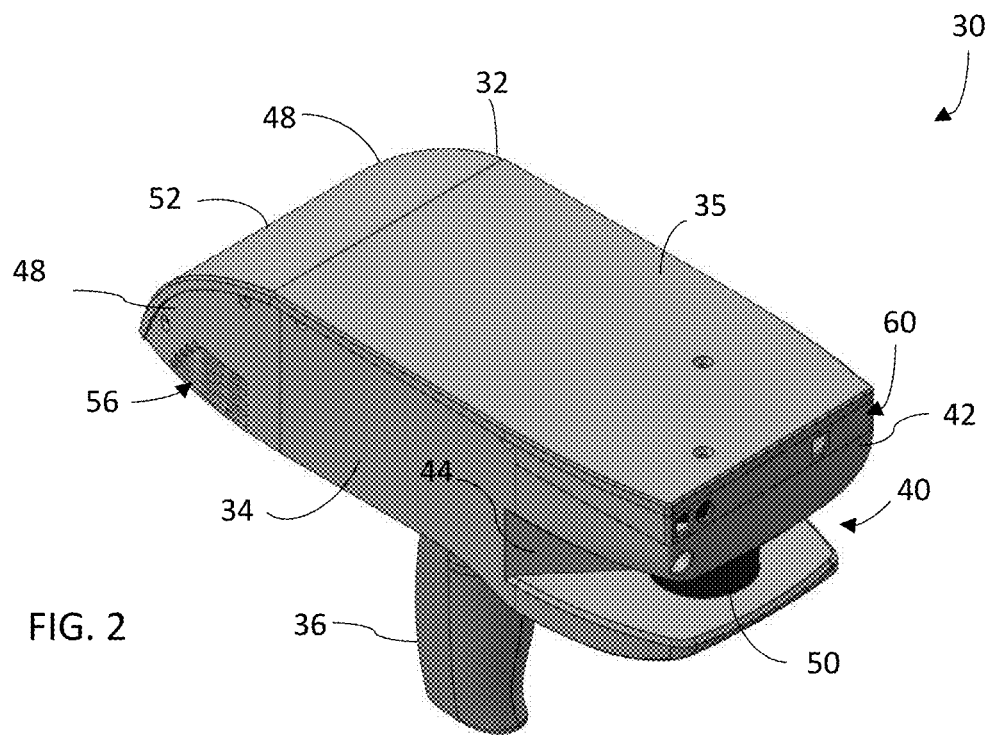
FIGS. 2-4 are perspective views of a scanning and mapping system in accordance with an embodiment.
Figure 3:
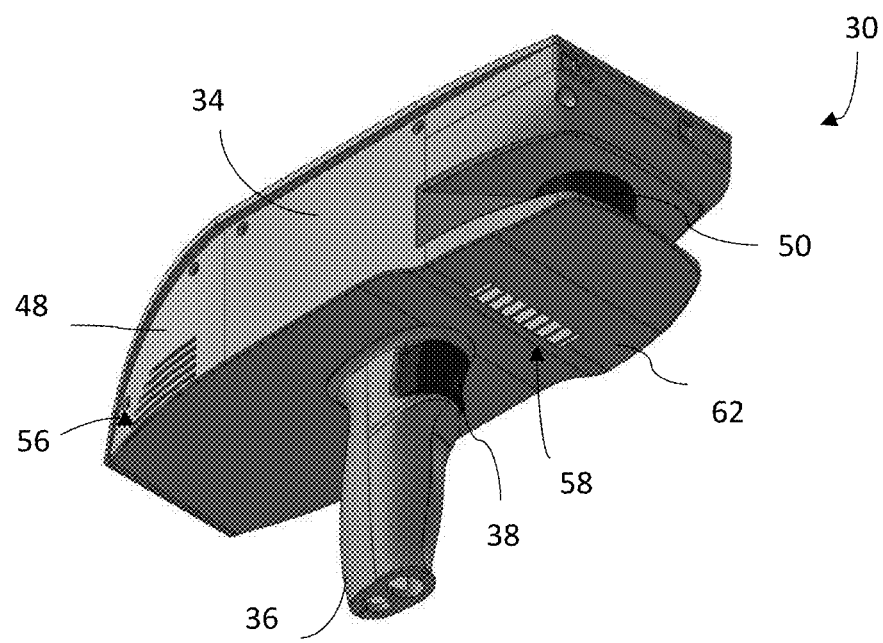
Figure 4:
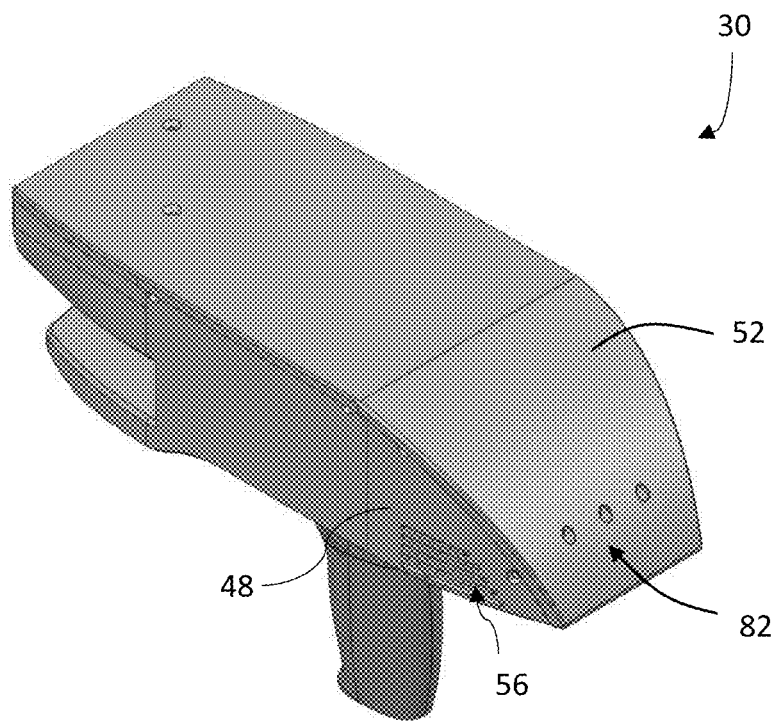
Figure 5:
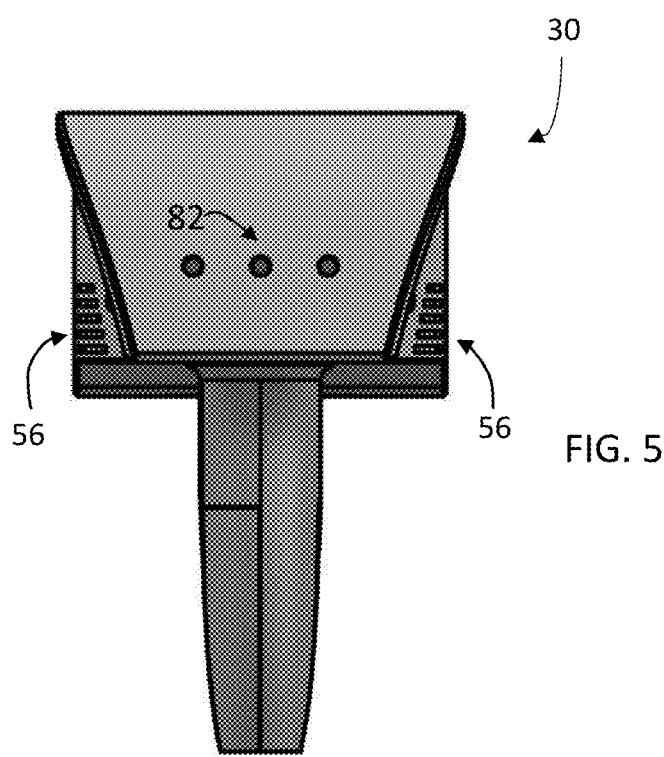
FIG. 5 is a first end view of the system of FIG. 2.
Figure 6:
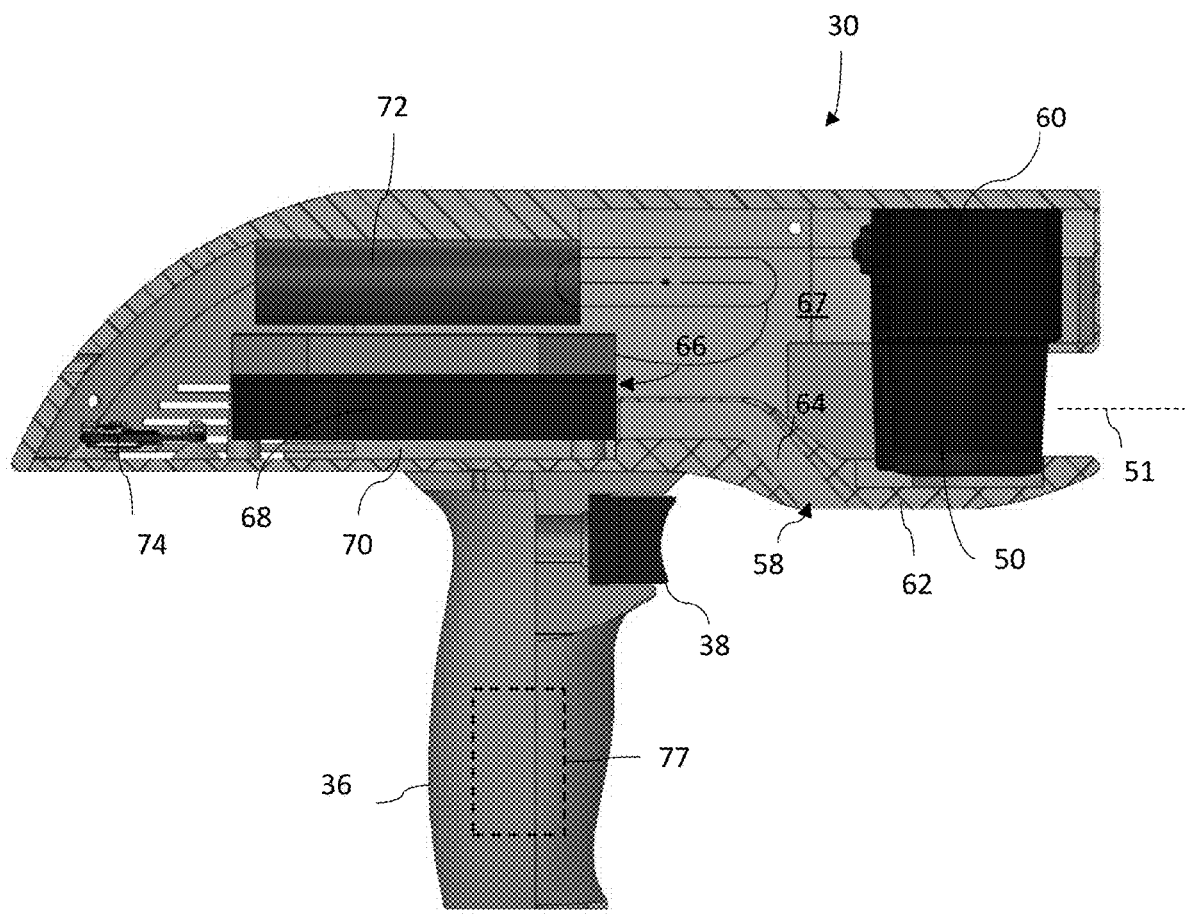
FIG. 6 is a side sectional view of the system of FIG. 2.
Figure 7:
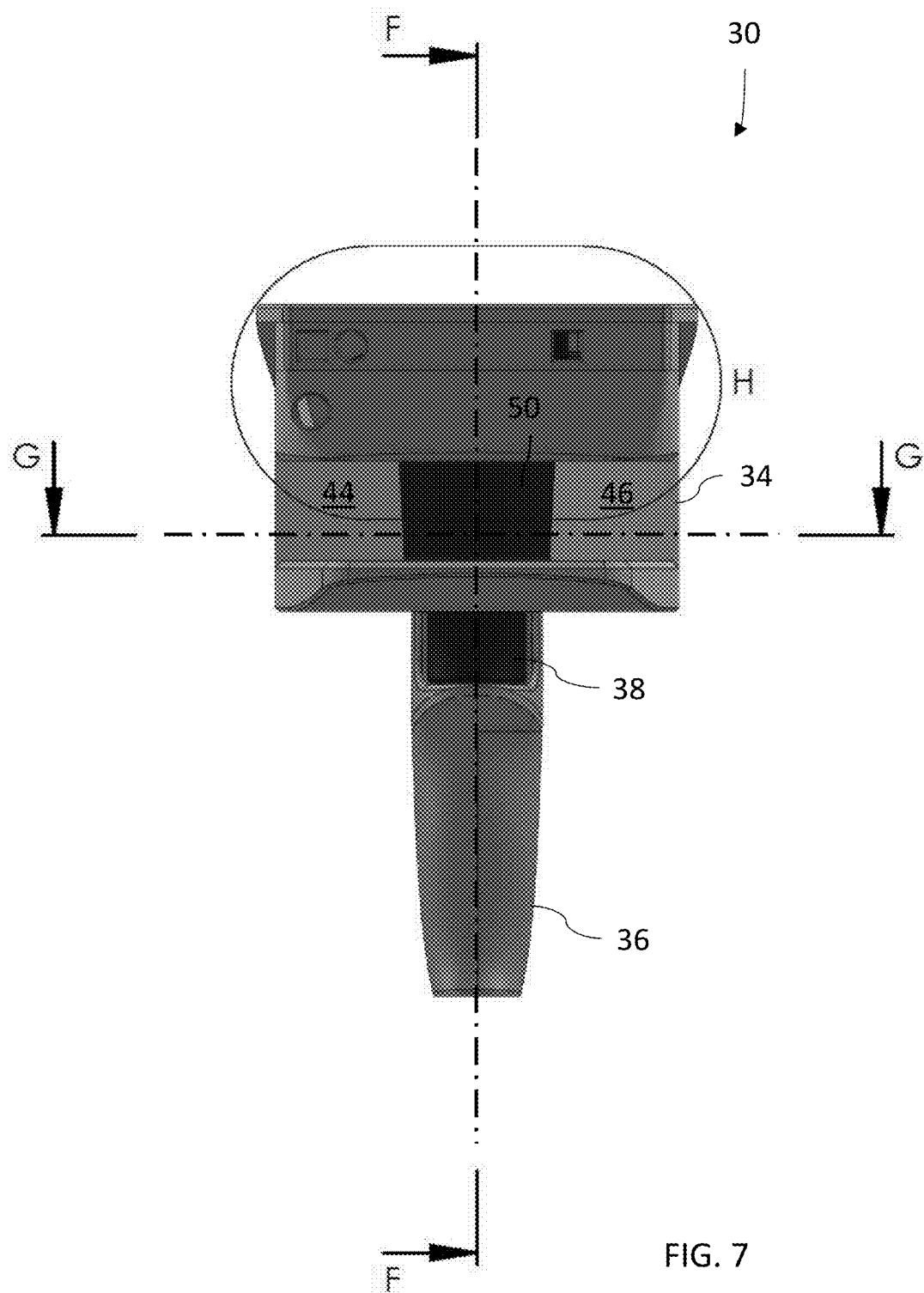
FIG. 7 is a second end view of the system of FIG. 2.
Figure 8:
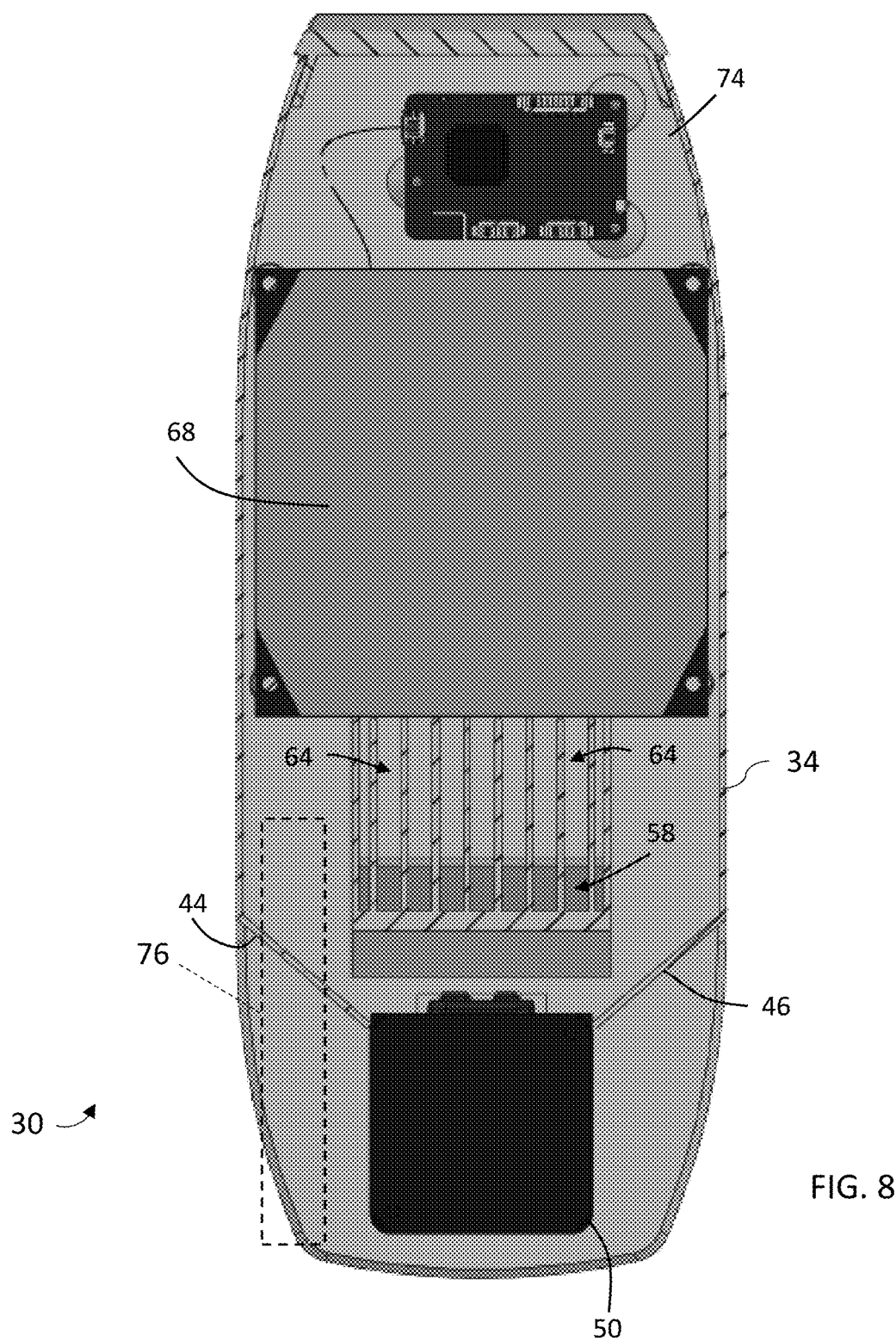
FIG. 8 is a top sectional view of the system of FIG. 2.

For example, in the map 20 of FIG. 1, a scan is performed that generates a two-dimensional map (2D map) of a hallway 22. As the operator opens the door 24 to proceed into the room 26, the system uses the edge of the door as a reference point for registration of the data. As a result, when the room 26 is scanned and the data is combined with that from hallway 22, the room 26 will be rotated on the map relative to the hallway 22, resulting in an improperly oriented room 28. The technical solutions provided by the one or more embodiments of the present invention address such technical challenges by facilitating a user to improve the quality of the 2D map 20 without performing the mapping task all over again.

Referring now to FIGS. 2-8, an embodiment of a system 30 having a housing 32 that includes a body portion 34 and a handle portion 36. The handle 36 may include an actuator 38 that allows the operator to interact with the system 30. In the exemplary embodiment, the body 34 includes a generally rectangular center portion 35 with a slot 40 formed in an end 42. The slot 40 is at least partially defined by a pair walls 44, 46 that are angled towards a second end 48. As will be discussed in more detail herein, a portion of a two-dimensional scanner 50 is arranged between the walls 44, 46. The walls 44, 46 are angled to allow the scanner 50 to operate by emitting a light over a large angular area without interference from the walls 44, 46. As will be discussed in more detail herein, the end 42 may further include a three-dimensional camera or RGBD camera 60.

In the exemplary embodiment, the second end 48 is defined by a semi-cylindrical surface 52 and a pair of side walls 54. In an embodiment, the side walls 54 include a plurality of exhaust vent openings 56. The exhaust vent openings 56 are fluidly coupled to intake vent openings 58 arranged on a bottom surface 62 of center portion 35. The intake vent openings 58 allow external air to enter a conduit 64 having an opposite opening 66 (FIG. 6) in fluid communication with the hollow interior 67 of the body 34. In an embodiment, the opening 66 is arranged adjacent to a controller 68 which has one or more processors that is operable to perform the methods described herein. In an embodiment, the external air flows from the opening 66 over or around the controller 68 and out the exhaust vent openings 56.

The controller 68 is coupled to a wall 70 of body 34. In an embodiment, the wall 70 is coupled to or integral with the handle 36. The controller 68 is electrically coupled to the 2D scanner 50, the 3D camera 60, a power source 72, an inertial measurement unit (IMU) 74, a laser line projector 76, and a haptic feedback device 77.

Figure 10:
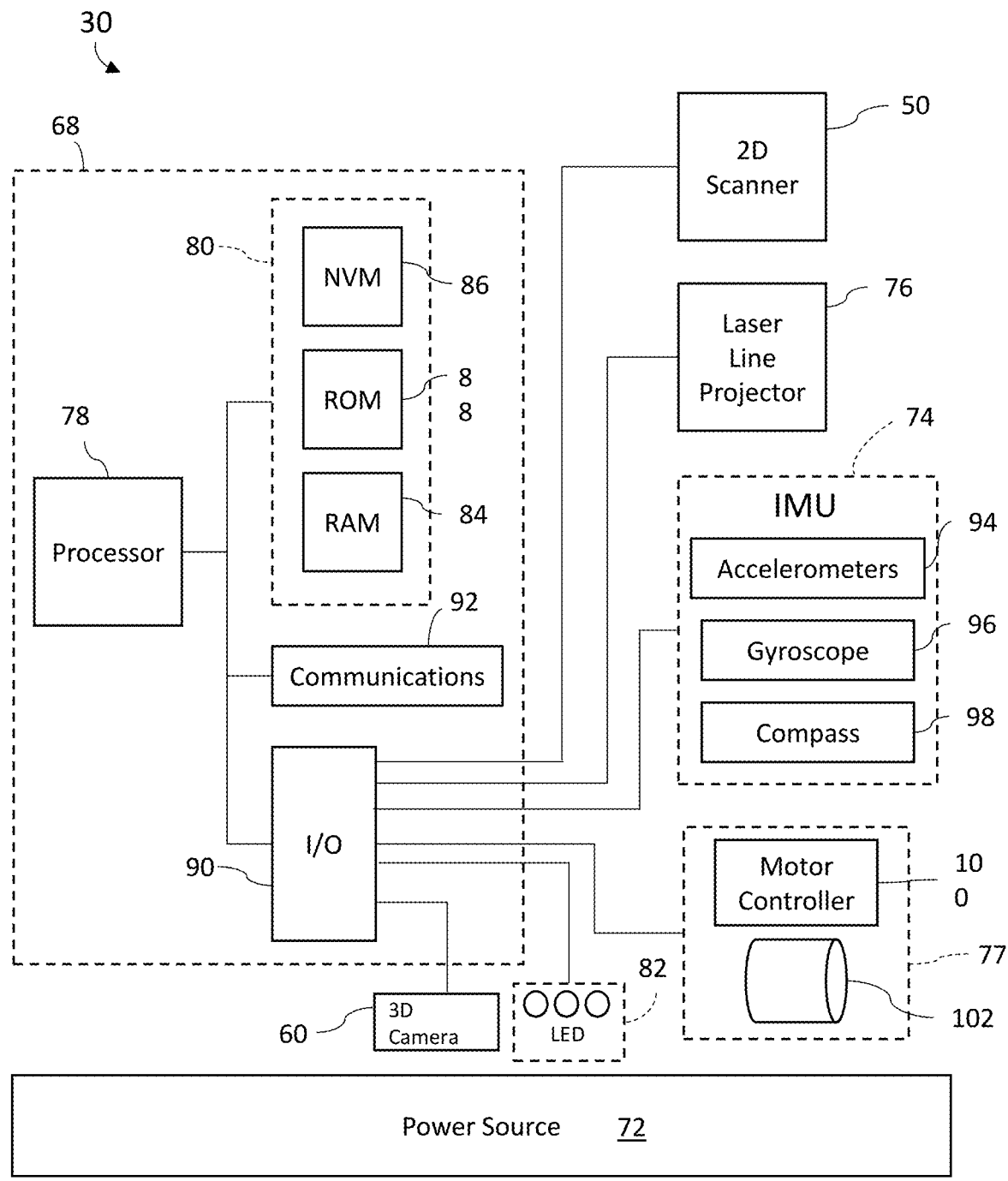
FIG. 10 is a schematic illustration of the system of a scanning and mapping system in accordance with an embodiment.

Referring now to FIG. 10 with continuing reference to FIGS. 2-8, elements are shown of the system 30. Controller 68 is a suitable electronic device capable of accepting data and instructions, executing the instructions to process the data, and presenting the results. The controller 68 includes one or more processing elements 78. The processors may be microprocessors, field programmable gate arrays (FPGAs), digital signal processors (DSPs), and generally any device capable of performing computing functions. The one or more processors 78 have access to memory 80 for storing information.

Controller 68 is capable of converting the analog voltage or current level provided by 2D scanner 50, 3D camera 60 and IMU 74 into a digital signal to determine a distance from the system 30 to an object in the environment. Controller 68 uses the digital signals that act as input to various processes for controlling the system 30. The digital signals represent one or more system 30 data including but not limited to distance to an object, images of the environment, acceleration, pitch orientation, yaw orientation and roll orientation.

In general, controller 68 accepts data from 2D scanner 50 and IMU 74 and is given certain instructions for the purpose of generating a two-dimensional map of a scanned environment. Controller 68 provides operating signals to the 2D scanner 50, the 3D camera 60, laser line projector 76 and haptic feedback device 77. Controller 68 also accepts data from IMU 74, indicating, for example, whether the operator is operating in the system in the desired orientation. The controller 68 compares the operational parameters to predetermined variances (e.g. yaw, pitch or roll thresholds) and if the predetermined variance is exceeded, generates a signal that activates the haptic feedback device 77. The data received by the controller 68 may be displayed on a user interface coupled to controller 68. The user interface may be one or more LEDs (light-emitting diodes) 82, an LCD (liquid-crystal diode) display, a CRT (cathode ray tube) display, or the like. A keypad may also be coupled to the user interface for providing data input to controller 68. In one embodiment, the user interface is arranged or executed on a mobile computing device that is coupled for communication, such as via a wired or wireless communications medium (e.g. Ethernet, serial, USB, Bluetooth™ or WiFi) for example, to the system 30.

The controller 68 may also be coupled to external computer networks such as a local area network (LAN) and the Internet. A LAN interconnects one or more remote computers, which are configured to communicate with controller 68 using a well-known computer communications protocol such as TCP/IP (Transmission Control Protocol/Internet (^) Protocol), RS-232, ModBus, and the like. Additional systems 30 may also be connected to LAN with the controllers 68 in each of these systems 30 being configured to send and receive data to and from remote computers and other systems 30. The LAN may be connected to the Internet. This connection allows controller 68 to communicate with one or more remote computers connected to the Internet.

The processors 78 are coupled to memory 80. The memory 80 may include random access memory (RAM) device 84, a non-volatile memory (NVM) device 86, a read-only memory (ROM) device 88. In addition, the processors 78 may be connected to one or more input/output (I/O) controllers 90 and a communications circuit 92. In an embodiment, the communications circuit 92 provides an interface that allows wireless or wired communication with one or more external devices or networks, such as the LAN discussed above.

Controller 68 includes operation control methods embodied in application code (illustrated by one or more flowcharts herein). These methods are embodied in computer instructions written to be executed by processors 78, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Coupled to the controller 68 is the 2D scanner 50. The 2D scanner 50 measures 2D coordinates in a plane. In the exemplary embodiment, the scanning is performed by steering light within a plane to illuminate object points in the environment. The 2D scanner 50 collects the reflected (scattered) light from the object points to determine 2D coordinates of the object points in the 2D plane. In an embodiment, the 2D scanner 50 scans a spot of light over an angle while at the same time measuring an angle value and corresponding distance value to each of the illuminated object points.

Examples of 2D scanners 50 include, but are not limited to Model LMS100 scanners manufactured by Sick, Inc of Minneapolis, Minn. and scanner Models URG-04LX-UG01 and UTM-30LX manufactured by Hokuyo Automatic Co., Ltd of Osaka, Japan. The scanners in the Sick LMS100 family measure angles over a 270 degree range and over distances up to 20 meters. The Hoyuko model URG-04LX-UG01 is a low-cost 2D scanner that measures angles over a 240 degree range and distances up to 4 meters. The Hoyuko model UTM-30LX is a 2D scanner that measures angles over a 270 degree range and to distances up to 30 meters. It should be appreciated that the above 2D scanners are exemplary and other types of 2D scanners are also available.

In an embodiment, the 2D scanner 50 is oriented so as to scan a beam of light over a range of angles in a generally horizontal plane (relative to the floor of the environment being scanned). At instants in time the 2D scanner 50 returns an angle reading and a corresponding distance reading to provide 2D coordinates of object points in the horizontal plane. In completing one scan over the full range of angles, the 2D scanner returns a collection of paired angle and distance readings. As the system 30 is moved from place to place, the 2D scanner 50 continues to return 2D coordinate values. These 2D coordinate values are used to locate the position of the system 30 thereby enabling the generation of a two-dimensional map or floorplan of the environment.

Also coupled to the controller 86 is the IMU 74. The IMU 74 is a position/orientation sensor that may include accelerometers 94 (inclinometers), gyroscopes 96, a magnetometers or compass 98, and altimeters. In the exemplary embodiment, the IMU 74 includes multiple accelerometers 94 and gyroscopes 96. The compass 98 indicates a heading based on changes in magnetic field direction relative to the earth's magnetic north. The IMU 74 may further have an altimeter that indicates altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices. In the exemplary embodiment, the IMU 74 determines the pose or orientation of the system 30 about three-axis to allow a determination of a yaw, roll and pitch parameter.

Figure 9:
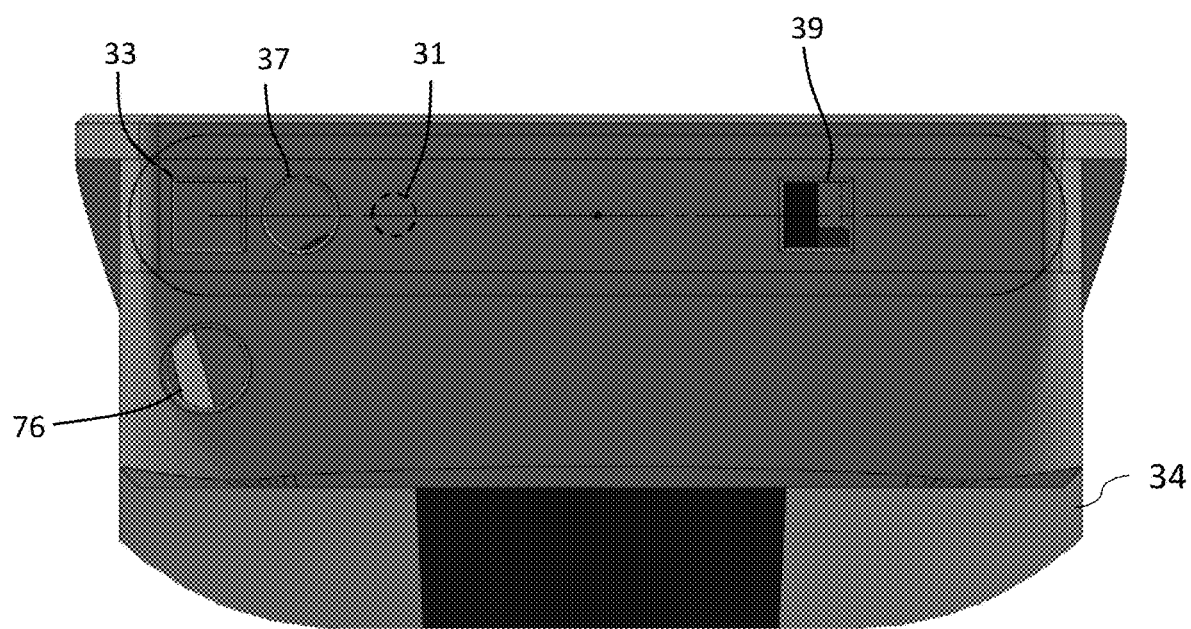
FIG. 9 is an enlarged view of a portion of the second end of FIG. 7.

In embodiment, the system 30 further includes a 3D camera 60. As used herein, the term 3D camera refers to a device that produces a two-dimensional image that includes distances to a point in the environment from the location of system 30. The 3D camera 30 may be a range camera or a stereo camera. In an embodiment, the 3D camera 30 includes an RGB-D sensor that combines color information with a per-pixel depth information. In an embodiment, the 3D camera 30 may include an infrared laser projector 31 (FIG. 9), a left infrared camera 33, a right infrared camera 39, and a color camera 37. In an embodiment, the 3D camera 60 is a RealSense™ camera model R200 manufactured by Intel Corporation.

In the exemplary embodiment, the system 30 is a handheld portable device that is sized and weighted to be carried by a single person during operation. Therefore, the plane 51 (FIG. 6) in which the 2D scanner 50 projects a light beam may not be horizontal relative to the floor or may continuously change as the computer moves during the scanning process. Thus, the signals generated by the accelerometers 94, gyroscopes 96 and compass 98 may be used to determine the pose (yaw, roll, tilt) of the system 30 and determine the orientation of the plane 51.

In an embodiment, it may be desired to maintain the pose of the system 30 (and thus the plane 51) within predetermined thresholds relative to the yaw, roll and pitch orientations of the system 30. In an embodiment, a haptic feedback device 77 is disposed within the housing 32, such as in the handle 36. The haptic feedback device 77 is a device that creates a force, vibration or motion that is felt or heard by the operator. The haptic feedback device 77 may be, but is not limited to: an eccentric rotating mass vibration motor or a linear resonant actuator for example. The haptic feedback device is used to alert the operator that the orientation of the light beam from 2D scanner 50 is equal to or beyond a predetermined threshold. In operation, when the IMU 74 measures an angle (yaw, roll, pitch or a combination thereof), the controller 68 transmits a signal to a motor controller 100 that activates a vibration motor 102. Since the vibration originates in the handle 36, the operator will be notified of the deviation in the orientation of the system 30. The vibration continues until the system 30 is oriented within the predetermined threshold or the operator releases the actuator 38. In an embodiment, it is desired for the plane 51 to be within 10-15 degrees of horizontal (relative to the ground) about the yaw, roll and pitch axes.

Figure 11:
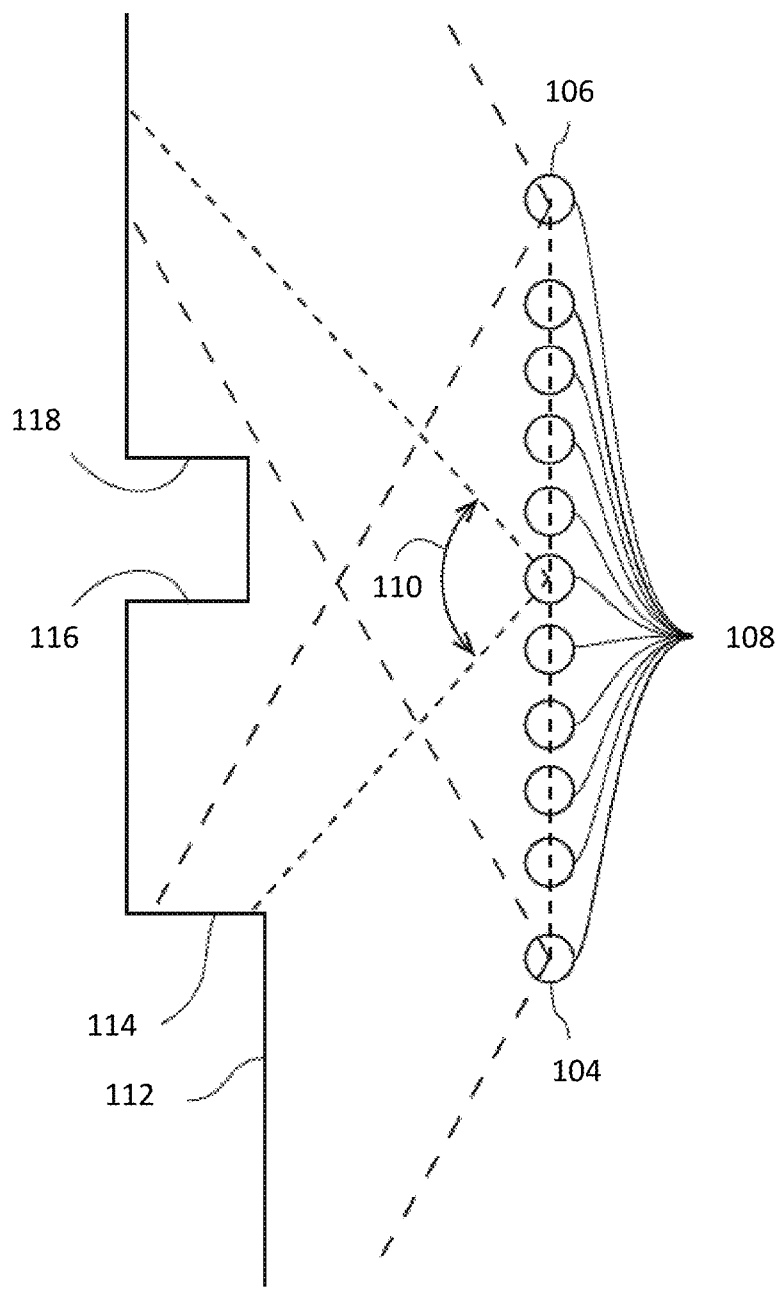
FIGS. 11-13 are plan views of stages of a two-dimensional map generated in accordance with an embodiment.

In an embodiment, the 2D scanner 50 makes measurements as the system 30 is moved about an environment, such as from a first position 104 to a second registration position 106 as shown in FIG. 11. In an embodiment, 2D scan data is collected and processed as the system 30 passes through a plurality of 2D measuring positions 108. At each measuring position 108, the 2D scanner 50 collects 2D coordinate data over an effective FOV 110. Using methods described in more detail below, the controller 86 uses 2D scan data from the plurality of 2D scans at positions 108 to determine a position and orientation of the system 30 as it is moved about the environment. In an embodiment, the common coordinate system is represented by 2D Cartesian coordinates x, y and by an angle of rotation θ relative to the x or y axis. In an embodiment, the x and y axes lie in the plane of the 2D scanner and may be further based on a direction of a "front" of the 2D scanner 50.

Figure 12:
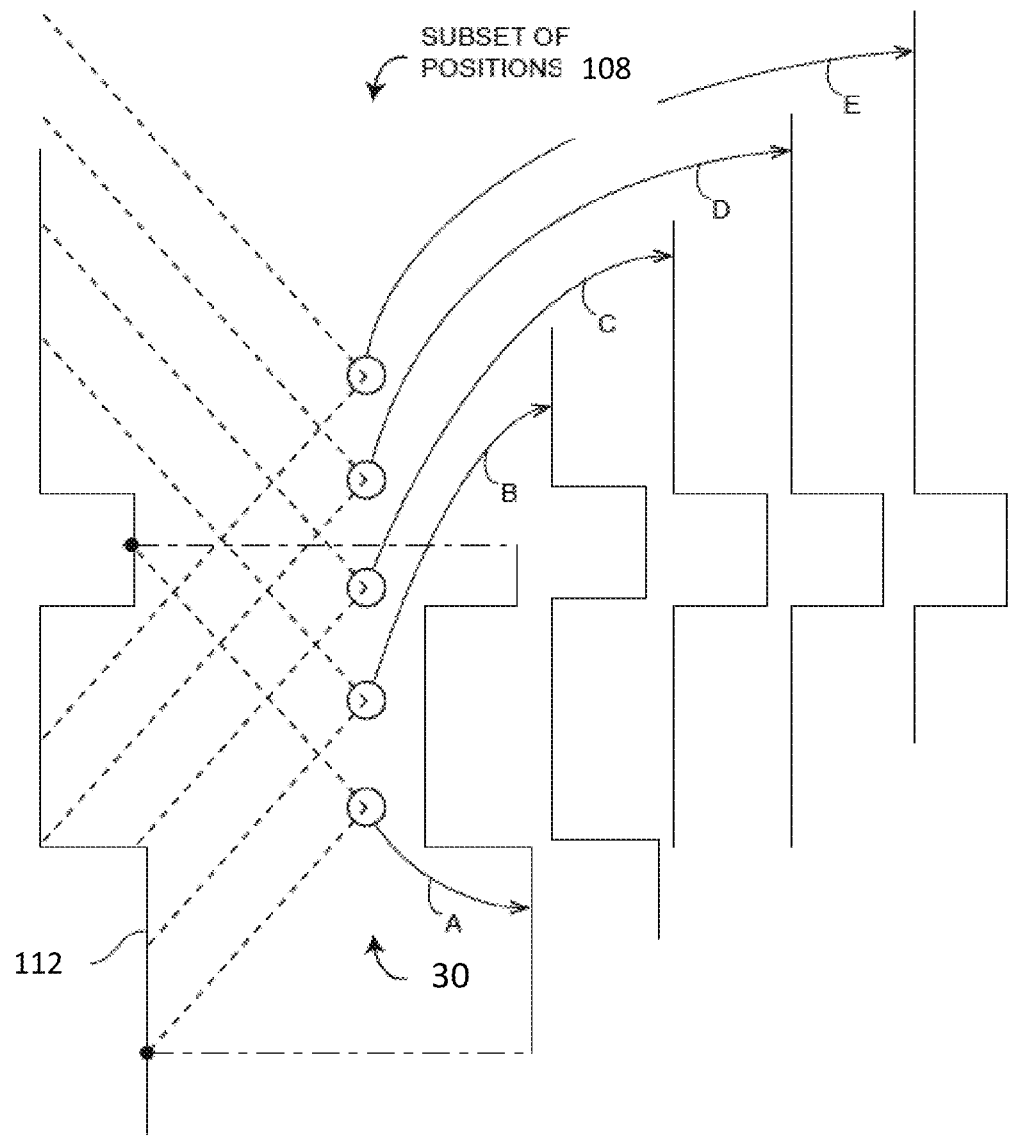

FIG. 12 shows the 2D system 30 collecting 2D scan data at selected positions 108 over an effective FOV 110. At different positions 108, the 2D scanner 50 captures a portion of the object 112 marked A, B, C, D, and E. FIG. 11 shows 2D scanner 50 moving in time relative to a fixed frame of reference of the object 112.

Figure 13:
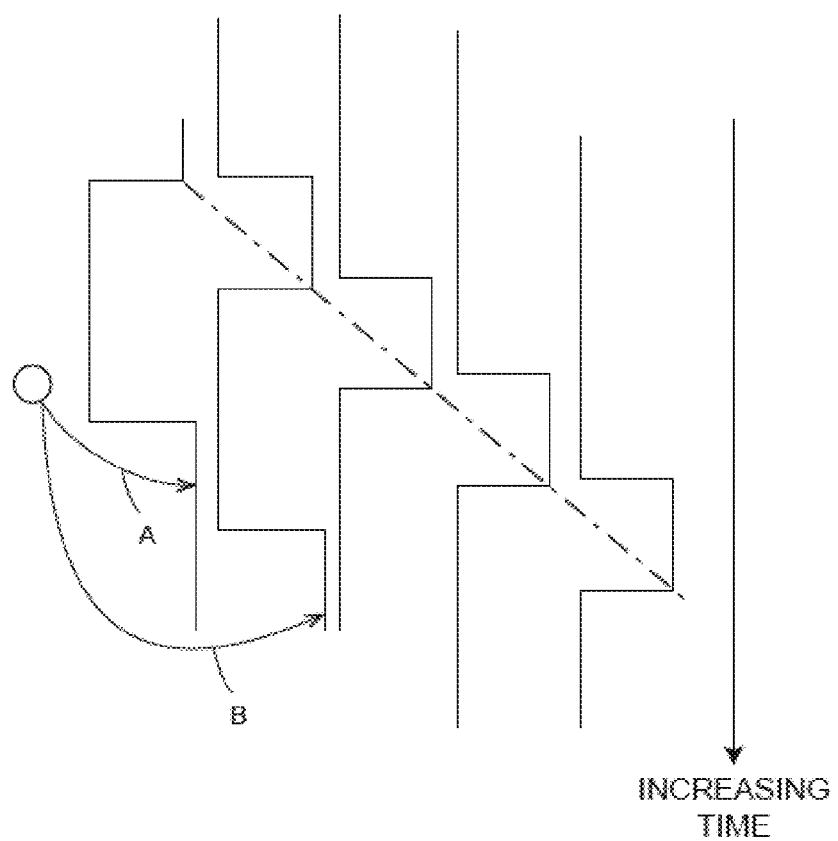

FIG. 13 includes the same information as FIG. 12 but shows it from the frame of reference of the system 30 rather than the frame of reference of the object 112. FIG. 13 illustrates that in the system 30 frame of reference, the position of features on the object change over time. Therefore, the distance traveled by the system 30 can be determined from the 2D scan data sent from the 2D scanner 50 to the controller 86.

As the 2D scanner 50 takes successive 2D readings and performs best-fit calculations, the controller 86 keeps track of the translation and rotation of the 2D scanner 50, which is the same as the translation and rotation of the system 30. In this way, the controller 86 is able to accurately determine the change in the values of x, y, θ as the system 30 moves from the first position 104 to the second position 106.

In an embodiment, the controller 86 is configured to determine a first translation value, a second translation value, along with first and second rotation values (yaw, roll, pitch) that, when applied to a combination of the first 2D scan data and second 2D scan data, results in transformed first 2D data that closely matches transformed second 2D data according to an objective mathematical criterion. In general, the translation and rotation may be applied to the first scan data, the second scan data, or to a combination of the two. For example, a translation applied to the first data set is equivalent to a negative of the translation applied to the second data set in the sense that both actions produce the same match in the transformed data sets. An example of an "objective mathematical criterion" is that of minimizing the sum of squared residual errors for those portions of the scan data determined to overlap. Another type of objective mathematical criterion may involve a matching of multiple features identified on the object. For example, such features might be the edge transitions 114, 116, and 118 shown in FIG. 11. The mathematical criterion may involve processing of the raw data provided by the 2D scanner 50 to the controller 86, or it may involve a first intermediate level of processing in which features are represented as a collection of line segments using methods that are known in the art, for example, methods based on the Iterative Closest Point (ICP). Such a method based on ICP is described in Censi, A., "An ICP variant using a point-to-line metric," IEEE International Conference on Robotics and Automation (ICRA) 2008, which is incorporated by reference herein.

In an embodiment, assuming that the plane 51 of the light beam from 2D scanner 50 remains horizontal relative to the ground plane, the first translation value is dx, the second translation value is dy, and the first rotation value $d\theta$. If the first scan data is collected with the 2D scanner 50 having translational and rotational coordinates (in a reference coordinate system) of $(x_1, y_1, \theta_1)$, then when the second 2D scan data is collected at a second location the coordinates are given by $(x_2, y_2, \theta_2)=(x_1+dx, y_1+dy, \theta_1+d\theta)$. In an embodiment, the controller 86 is further configured to determine a third translation value (for example, dz) and a second and third rotation values (for example, pitch and roll). The third translation value, second rotation value, and third rotation value may be determined based at least in part on readings from the IMU 74.

The 2D scanner 50 collects 2D scan data starting at the first position 104 and more 2D scan data at the second position 106. In some cases, these scans may suffice to determine the position and orientation of the system 30 at the second position 106 relative to the first position 104. In other cases, the two sets of 2D scan data are not sufficient to enable the controller 86 to accurately determine the first translation value, the second translation value, and the first rotation value. This problem may be avoided by collecting 2D scan data at intermediate scan positions 108. In an embodiment, the 2D scan data is collected and processed at regular intervals, for example, once per second. In this way, features in the environment are identified in successive 2D scans at positions 108. In an embodiment, when more than two 2D scans are obtained, the controller 86 may use the information from all the successive 2D scans in determining the translation and rotation values in moving from the first position 104 to the second position 106. In another embodiment, only the first and last scans in the final calculation, simply using the intermediate 2D scans to ensure proper correspondence of matching features. In most cases, accuracy of matching is improved by incorporating information from multiple successive 2D scans.

It should be appreciated that as the system 30 is moved beyond the second position 106, a two-dimensional image or map of the environment being scanned may be generated.

Figure 14:
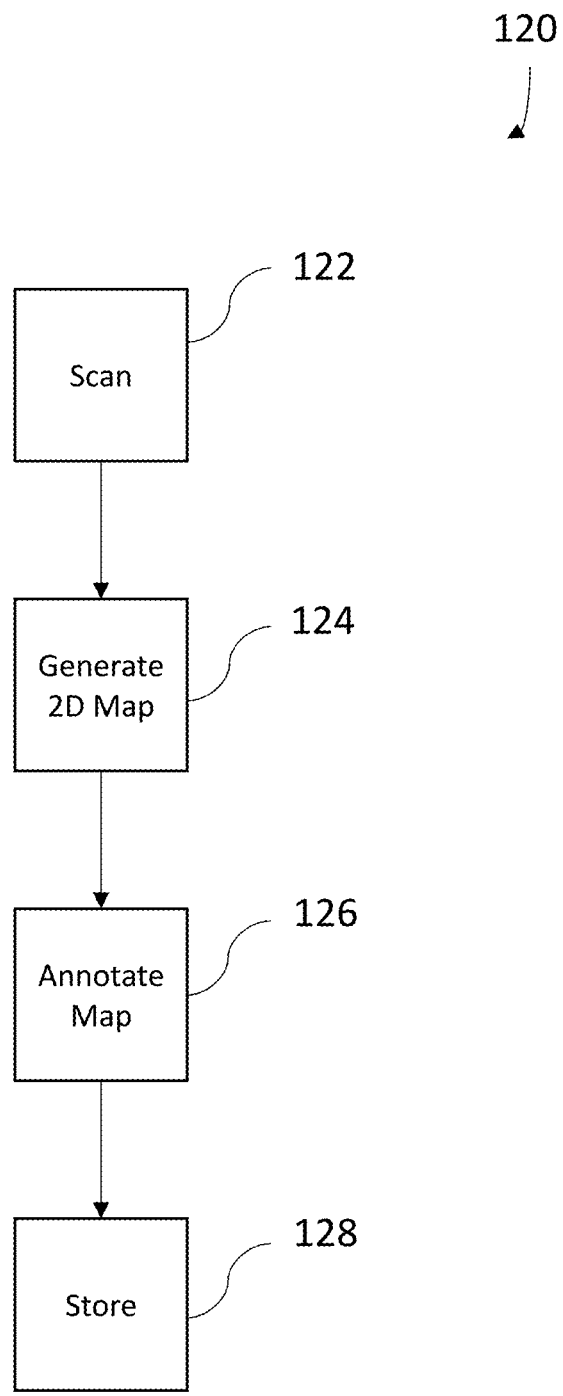
FIG. 14 is a flow diagram of a method of generating a two-dimensional map with annotations in accordance with an embodiment.
Figure 15:
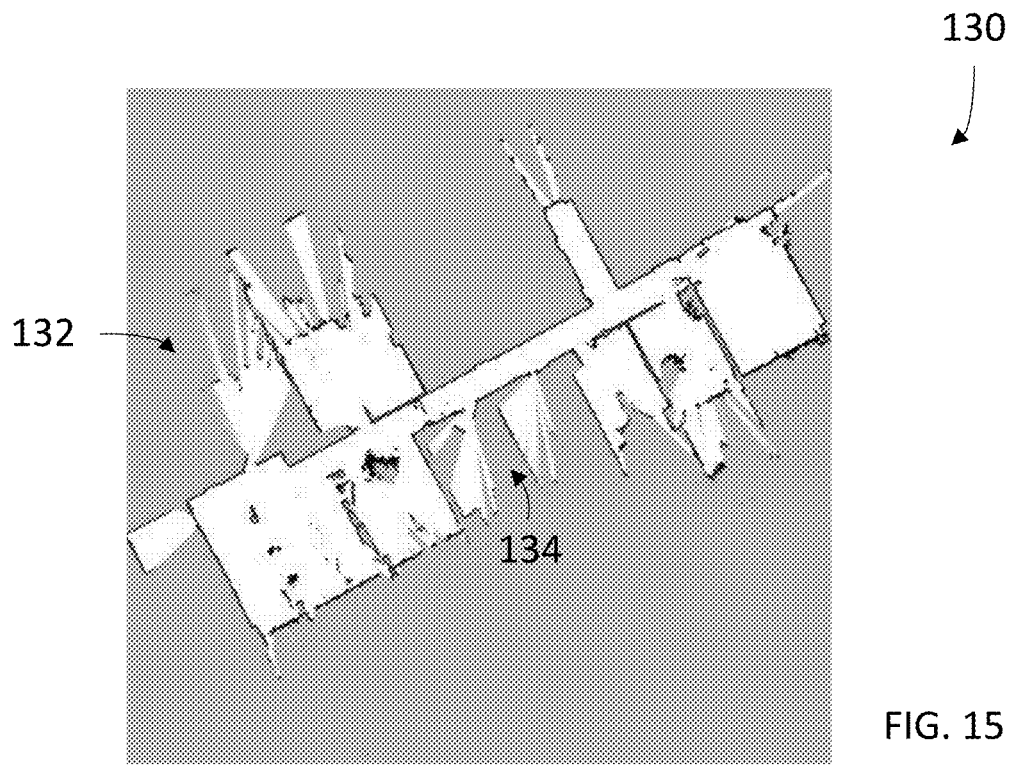
FIG. 15-18 are plan views of stages of a two-dimensional map generated with the method of FIG. 10 in accordance with an embodiment.

Referring now to FIG. 14, a method 120 is shown for generating a two-dimensional map with annotations. The method 120 starts in block 122 where the facility or area is scanned to acquire scan data 130, such as that shown in FIG. 15. The scanning is performed by carrying the system 30 through the area to be scanned. The system 30 measures distances from the system 30 to an object, such as a wall for example, and also a pose of the system 30 in an embodiment the user interacts with the system 30 via actuator 38. In other embodiments, a mobile computing device (e.g. cellular phone) provides a user interface that allows the operator to initiate the functions and control methods described herein. Using the registration process desired herein, the two dimensional locations of the measured points on the scanned objects (e.g. walls, doors, windows, cubicles, file cabinets etc.) may be determined. It is noted that the initial scan data may include artifacts, such as data that extends through a window 132 or an open door 134 for example. Therefore, the scan data 130 may include additional information that is not desired in a 2D map or layout of the scanned area.

Figure 16:
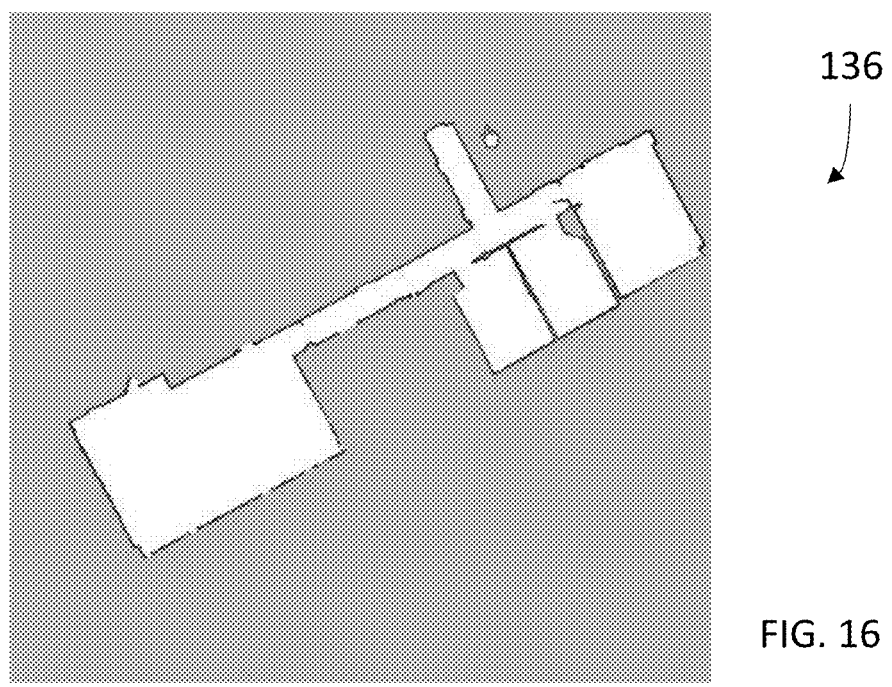
Figure 17:
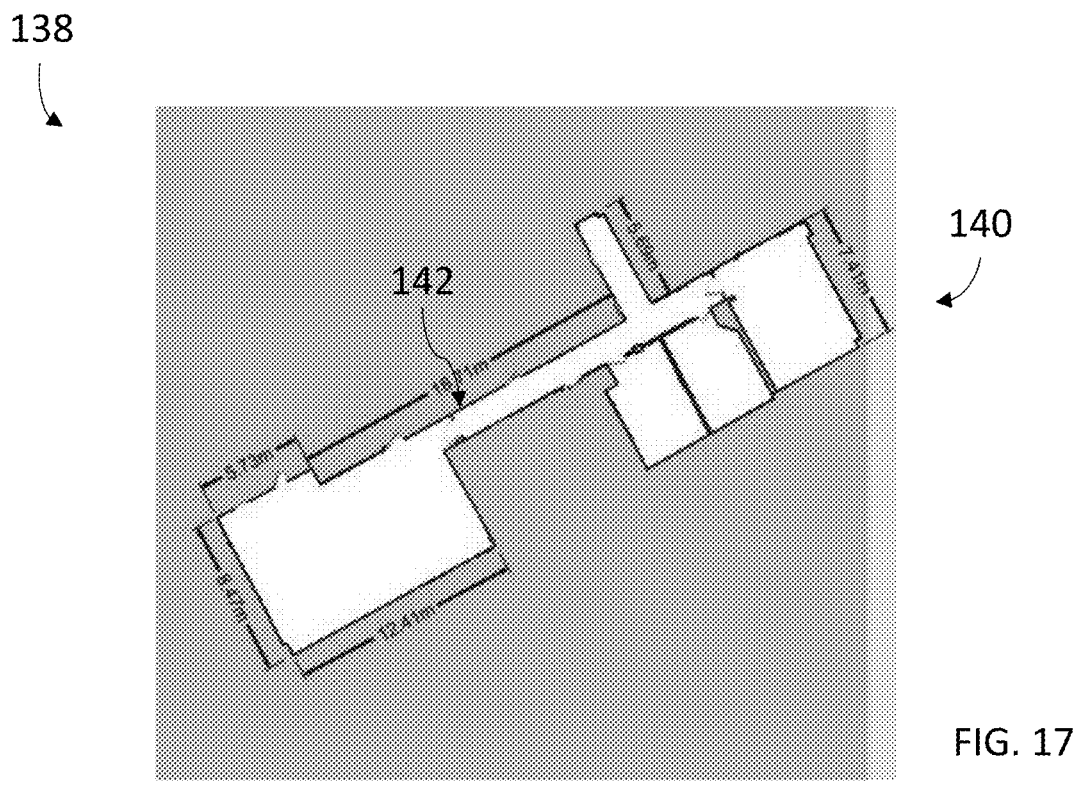
Figure 18:
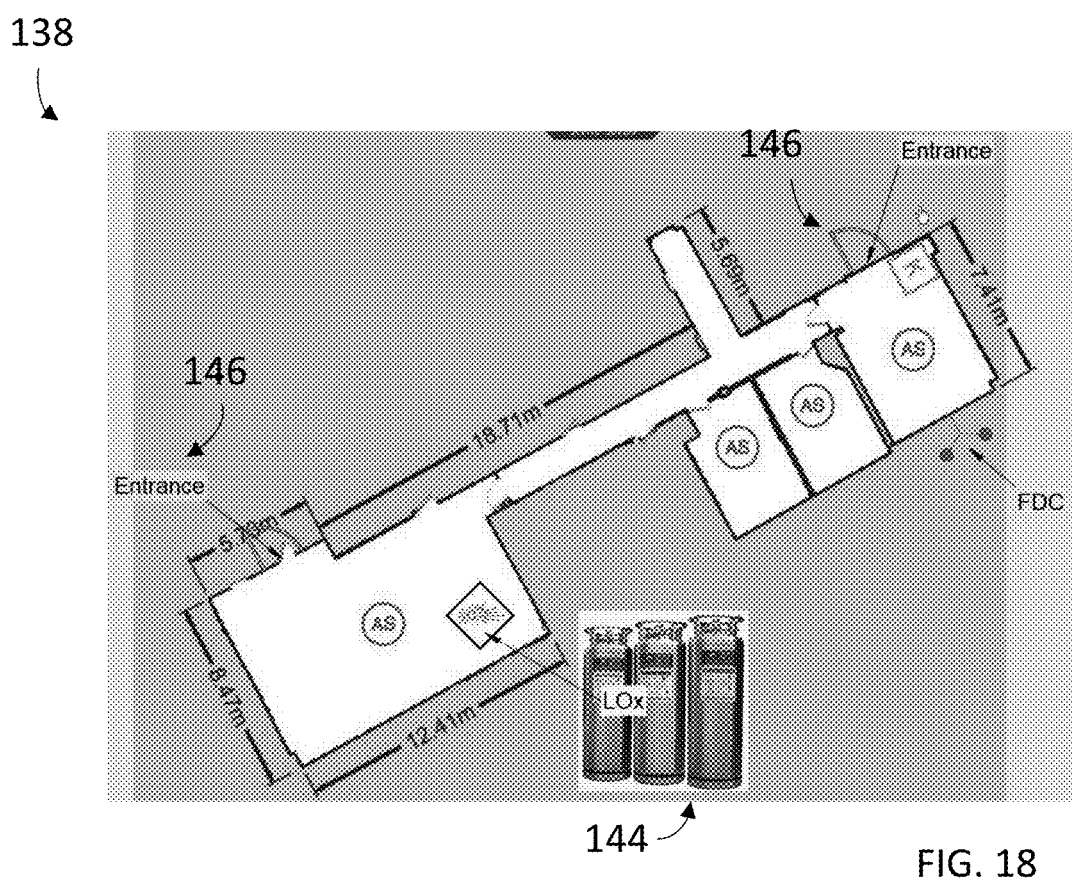

The method 120 then proceeds to block 124 where a 2D map 136 is generated of the scanned area as shown in FIG. 16. The generated 2D map 136 represents a scan of the area, such as in the form of a floor plan without the artifacts of the initial scan data. It should be appreciated that the 2D map 136 may be utilized directly by an architect, interior designer or construction contractor as it represents a dimensionally accurate representation of the scanned area. In the embodiment of FIG. 14, the method 120 then proceeds to block 126 where user-defined annotations are made to the 2D maps 136 to define an annotated 2D map 138 (FIG. 17 and FIG. 18) that includes information, such as dimensions of features 140, the location of doors 142, the relative positions of objects (e.g. liquid oxygen tanks 144, entrances/exits or egresses 146 or other notable features such as but not limited to the location of automated sprinkler system ("AS"), knox or key boxes ("K"), or fire department connection points ("FDC"). In some geographic regions, public safety services such as fire departments may keep records of building or facility layouts for use in case of an emergency as an aid to the public safety personnel in responding to an event. It should be appreciated that these annotations may be advantageous in alerting the public safety personnel to potential issues they may encounter when entering the facility, and also allow them to quickly locate egress locations.

Once the annotations of the 2D annotated map 138 are completed, the method 120 then proceeds to block 128 where the 2D annotated map 138 is stored in memory, such as nonvolatile memory 80 for example. The 2D annotated map 138 may also be stored in a network accessible storage device or server so that it may be accessed by the desired personnel.

Figure 19:
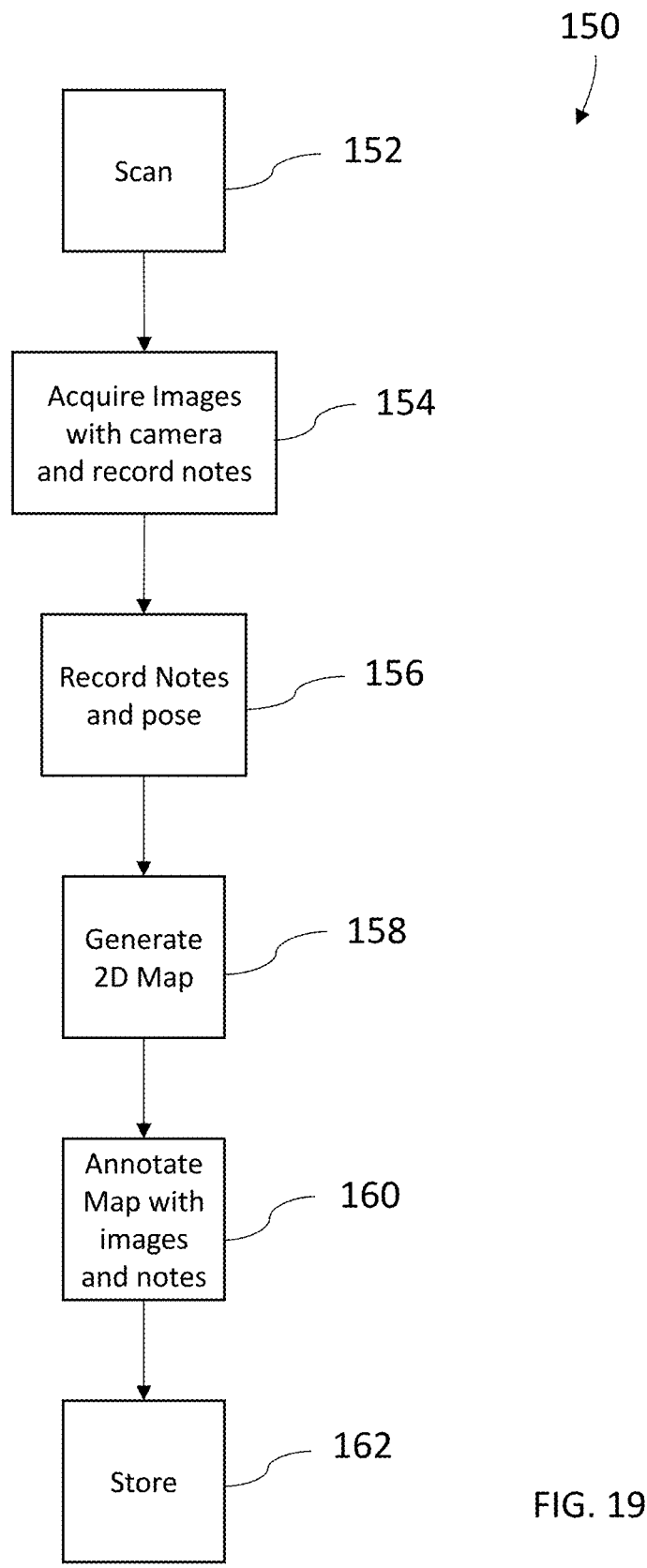
FIG. 19 is a flow diagram of a method of generating a two-dimensional map with annotations in accordance with an embodiment.

Referring now to FIG. 19, another method 150 is shown for generating a 2D map or layout. In this embodiment, the method 150 starts in block 152 with the operator initiating the scanning of an area or facility with the system 30 as described herein. The method 150 then proceeds to block 154 wherein the operator acquires images with a camera during the scanning process. The images may be acquired by a camera located in a mobile computing device (e.g. personal digital assistant, cellular phone, tablet or laptop) carried by the operator for example. In an embodiment, the system 30 may include a holder (not shown) that couples the mobile computing device to the system 30. In block 154, the operator may further record notes. These notes may be audio notes or sounds recorded by a microphone in the mobile computing device. These notes may further be textual notes input using a keyboard on the mobile computing device. It should be appreciated that the acquiring of images and recording of notes may be performed simultaneously, such as when the operator acquires a video. In an embodiment, the recording of the images or notes may be performed using a software application executed on a processor of the mobile computing device. The software application may be configured to communicate with the system 30, such as by a wired or wireless (e.g. Bluetooth™) connection for example, to transmit the acquired images or recorded notes to the system 30. In one embodiment, the operator may initiate the image acquisition by actuating actuator 38 that causes the software application to transition to an image acquisition mode.

Figure 20:
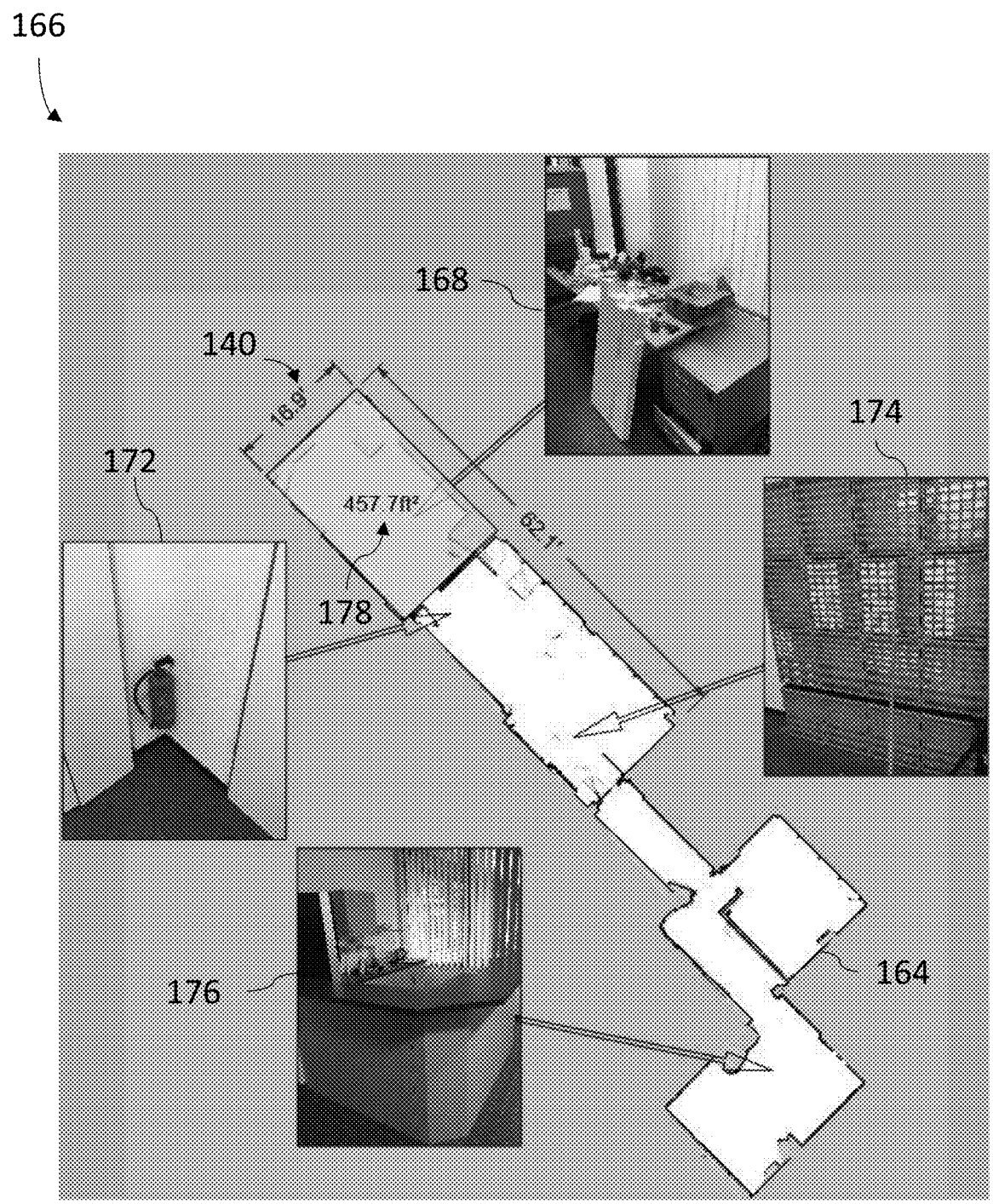
FIG. 20 is an annotated two-dimensional map generated with the method of FIG. 15 in accordance with an embodiment.

The method 150 then proceeds to block 156 where the images and notes are stored in memory, such as memory 80 for example. In an embodiment, the data on the pose of the system 30 is stored with the images and notes. In still another embodiment, the time or the location of the system 30 when the images are acquired or notes were recorded is also stored. Once the scanning of the area or facility is completed, the method 150 then proceeds to block 158 where the 2D map 164 (FIG. 20) is generated as described herein. The method then proceeds to block 160 where an annotated 2D map 166 (FIG. 20) is generated. The annotated 2D map 166 may include user-defined annotations, such as dimensions 140 or room size 178 described herein above with respect to FIG. 17. The annotations may further include user-defined free-form text or hyperlinks for example. Further, in the exemplary embodiment, the acquired images 168 and recorded notes are integrated into the annotated 2D map 166. In an embodiment, the image annotations are positioned to the side of the 2D map 164 the image was acquired or the note recorded. It should be appreciated that the images allow the operator to provide information to the map user on the location of objects, obstructions and structures, such as but not limited to fire extinguisher 172, barrier 174 and counter/desk 176 for example. Finally, the method 300 proceeds to block 162 where the annotated map is stored in memory.

It should be appreciated that the image or note annotations may be advantageous in embodiments where the annotated 2D map 166 is generated for public safety personnel, such as a fire fighter for example. The images allow the fire fighter to anticipate obstructions that may not be seen in the limited visibility conditions such as during a fire in the facility. The image or note annotations may further be advantageous in police or criminal investigations for documenting a crime scene and allow the investigator to make contemporaneous notes on what they find while performing the scan.

Figure 21:
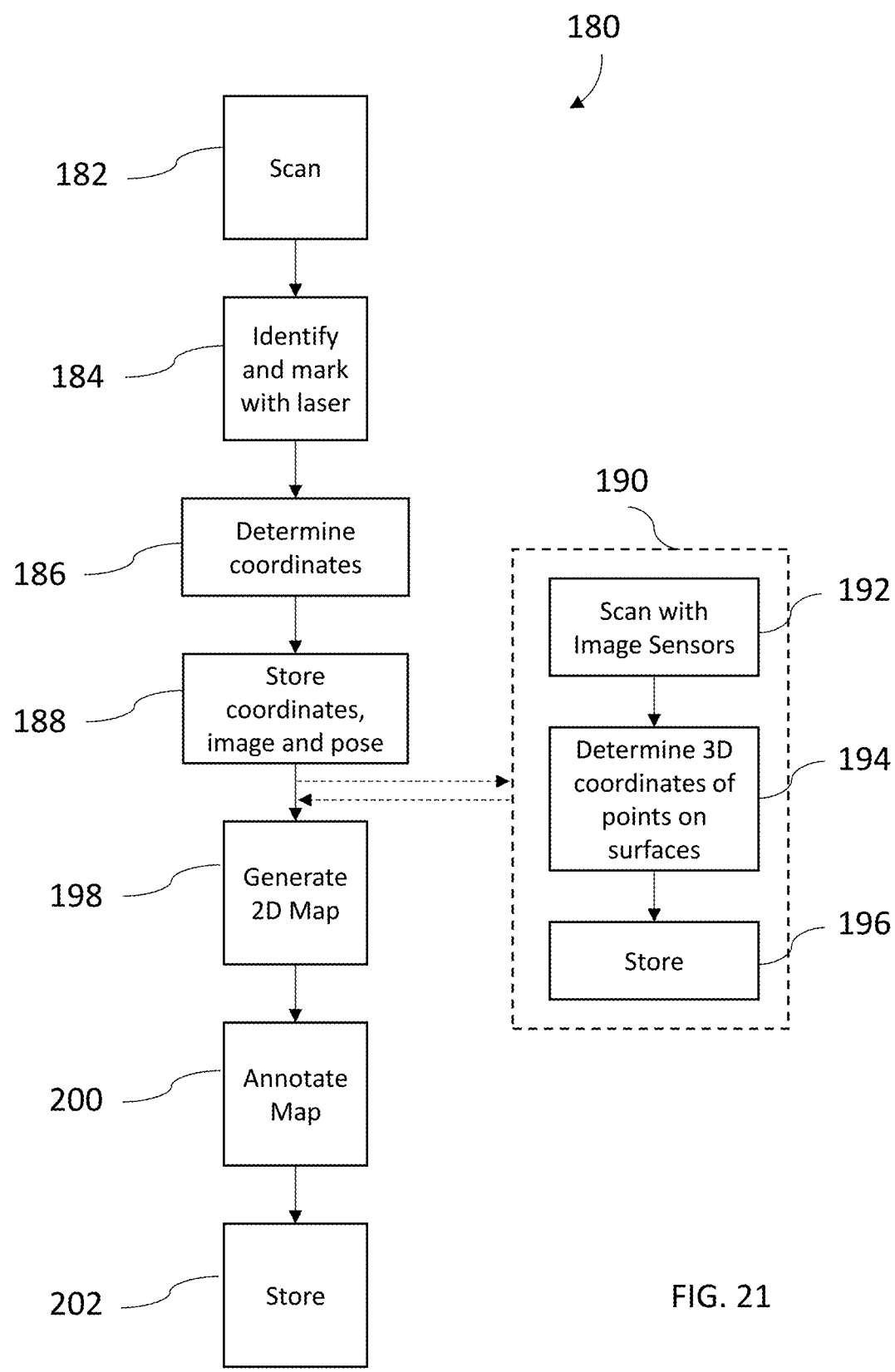
FIG. 21 is a flow diagram of a method of generating a two-dimensional map and a three-dimensional point cloud in accordance with an embodiment.
Figure 22:
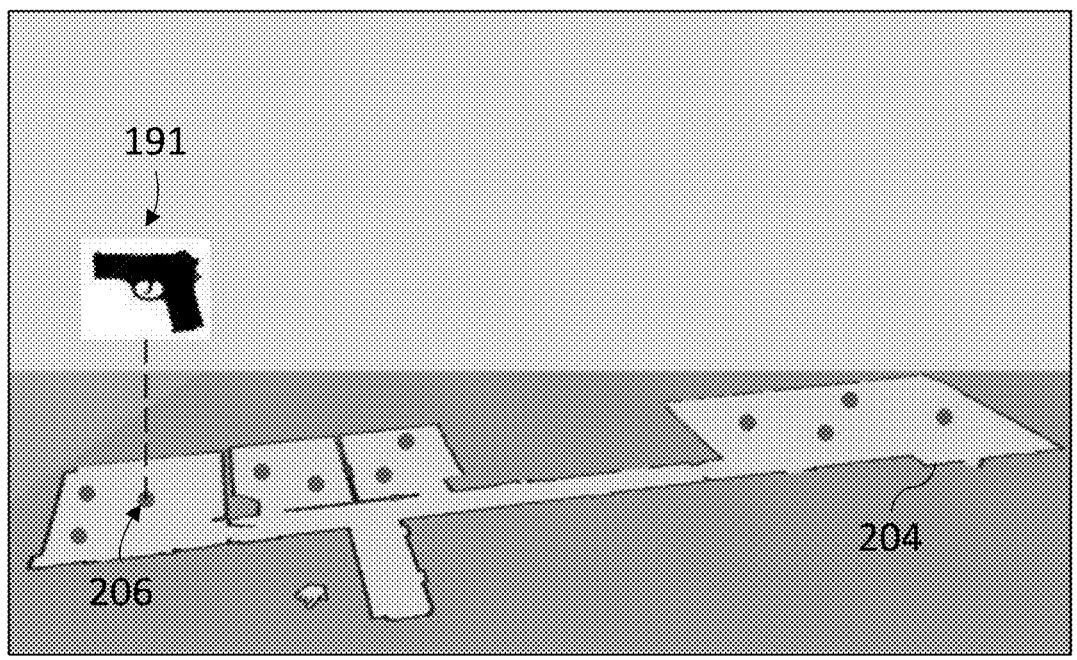
FIGS. 22-23 are views of annotated two-dimensional maps generated with the method of FIG. 21 in accordance with an embodiment.
Figure 23:
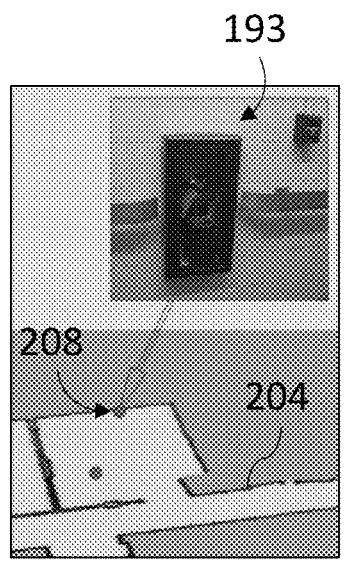

Referring now to FIG. 21, another method 180 is shown of generating a 2D map having annotation that include 3D coordinates of objects within the scanned area. The method 180 begins in block 182 with the operator scanning the area. During the scanning process, the operator may see an object, such as evidence 191 (FIG. 22) or equipment 193 (FIG. 23) for example, that the operator may desire to locate more precisely within the 2D map or acquire additional information. In an embodiment, the system 30 includes a laser projector 76 (FIG. 10) that the operator may activate. The laser projector 76 emits a visible beam of light that allows the operator to see the direction the system 76 is pointing. Once the operator locates the light beam from laser projector 76 on the desired object, the method 180 proceeds to block 186 where the coordinates of the spot on the object of interest are determined. In one embodiment, the coordinates of the object are determined by first determining a distance from system 30 to the object. In an embodiment, this distance may be determined by a 3D camera 60 (FIG. 10) for example. In addition to the distance, the 3D camera 60 also may acquire an image of the object. Based on knowing the distance along with the pose of the system 30, the coordinates of the object may be determined. The method 180 then proceeds to block 188 where the information (e.g. coordinates and image) of the object are stored in memory.

It should be appreciated that in some embodiments, the operator may desire to obtain a three-dimensional (3D) representation of the object of interest in addition to the location relative to the 2D map. In this embodiment, the method 180 proceeds to scanning block 190 and acquires 3D coordinates of points on the object of interest. In an embodiment, the object is scanned with the 3D camera 60 in block 192. The system 30 then proceeds to determine the 3D coordinates of points on the surface of the object or interest in block 194. In an embodiment, the 3D coordinates may be determined by determining the pose of the system 30 when the image is acquired by the 3D camera. The pose information along with the distances and a registration of the images acquired by the 3D camera may allow the generation of a 3D point cloud of the object of interest. In one embodiment, the orientation of the object of interest relative to the environment is also determined from the acquired images. This orientation information may also be stored and later used to accurately represent the object of interest on the 2D map. The method 180 then proceeds to block 196 where the 3D coordinate data is stored in memory.

The method 180 then proceeds to block 198 where the 2D map 204 (FIG. 22, FIG. 23) is generated as described herein. In an embodiment, the location of the objects of interest (determined in blocks 184-186) are displayed on the 2D map 204 as a symbol 206, such as a small circle for example. It should be appreciated that the 2D map 204 may include additional user-defined annotations added in block 200, such as those described herein with reference to FIG. 14 and FIG. 19. The 2D map 204 and the annotations are then stored in block 202.

In use, the map user may select one of the symbols, such as symbol 206 or symbol 208 for example. In response, an image of the object of interest 191, 193 may be displayed. Where the object or interest 191, 193 was scanned to obtain 3D coordinates of the object, the 3D representation of the object of interest 191, 193 may be displayed.

Figure 24:
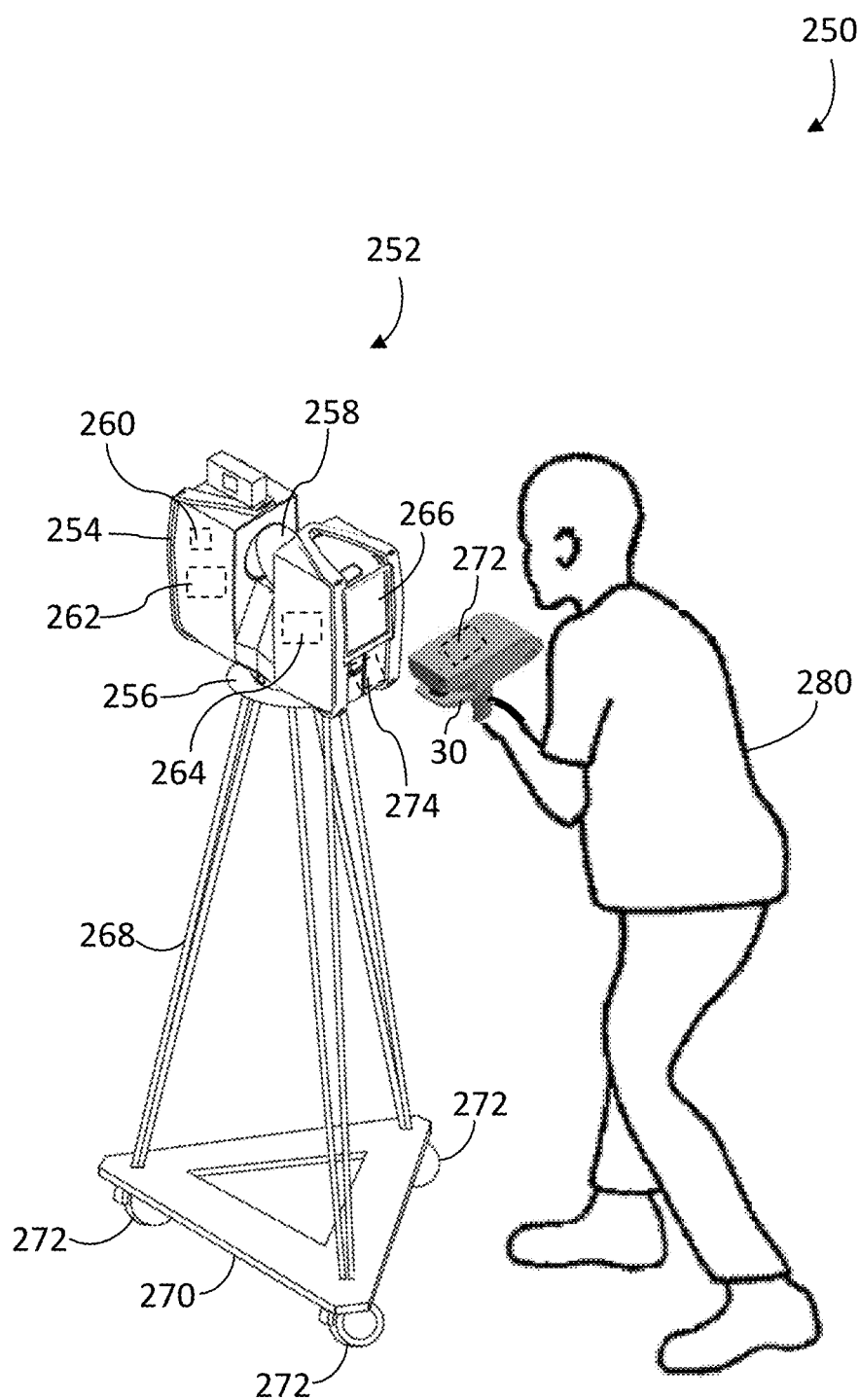
FIGS. 24-25 are views of a mobile mapping system in accordance with an embodiment.
Figure 25:
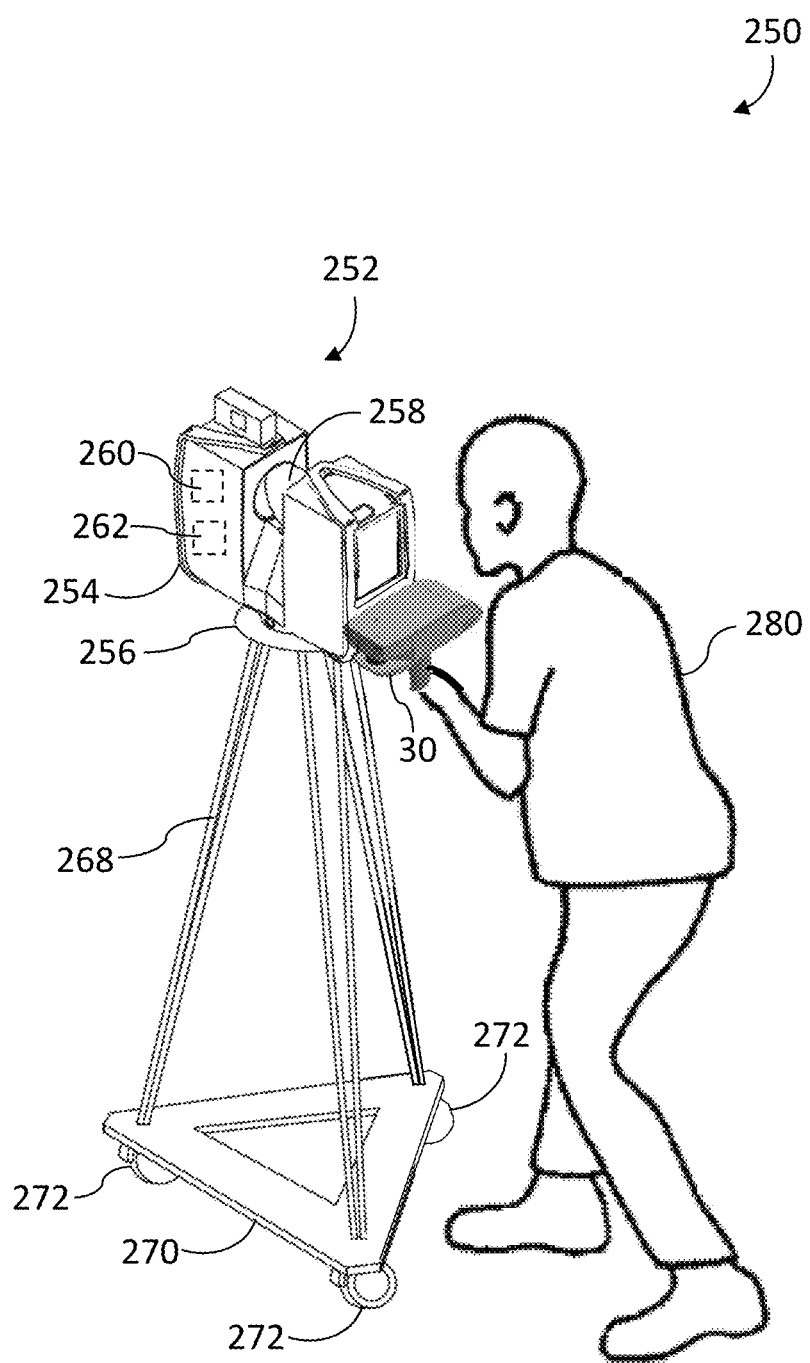

Referring now to FIG. 24 and FIG. 25, an embodiment of a mobile mapping system 250 is shown that includes a 2D scanner 30 and a 3D measurement device 252. In the exemplary embodiment, the 2D scanner 30 is the system 30 described herein with respect to FIGS. 2-8 and the 3D measurement device 252 is a laser scanner 252. The laser scanner 252 may be a time-of-flight type scanner such as the laser scanner described in commonly owned U.S. Pat. No. 8,705,016, the contents of which are incorporated by reference herein.

The laser scanner 252 has a measuring head 254 and a base 256. The measuring head 254 is mounted on the base 256 such that the laser scanner 252 may be rotated about a vertical axis (e.g. an axis extending perpendicular to the surface upon with the laser scanner 252 sits). In one embodiment, the measuring head 254 includes a gimbal point that is a center of rotation about the vertical axis and a horizontal axis. The measuring head 254 has a rotary mirror 258, which may be rotated about the horizontal axis. The rotation about the vertical axis may be about the center of the base 24. In the exemplary embodiment, the vertical axis and the horizontal axis are perpendicular to each other. The terms azimuth axis and zenith axis may be substituted for the terms vertical axis and horizontal axis, respectively. The term pan axis or standing axis may also be used as an alternative to vertical axis.

The measuring head 254 is further provided with an electromagnetic radiation emitter, such as light emitter 260, for example, that emits an emitted light beam 30. In one embodiment, the emitted light beam is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam is amplitude or intensity modulated, for example, with a sinusoidal waveform or with a rectangular waveform. The emitted light beam is emitted by the light emitter 260 onto the rotary mirror 258, where it is deflected to the environment. A reflected light beam is reflected from the environment by an object (e.g. a surface in the environment). The reflected or scattered light is intercepted by the rotary mirror 258 and directed into a light receiver 262. The directions of the emitted light beam and the reflected light beam result from the angular positions of the rotary mirror 258 and the measuring head 254 about the vertical and horizontal axes, respectively. These angular positions in turn depend on the corresponding rotary drives or motors.

Coupled to the light emitter 260 and the light receiver 262 is a controller 264. The controller 264 determines, for a multitude of measuring points, a corresponding number of distances between the laser scanner 252 and the points on object. The distance to a particular point is determined based at least in part on the speed of light in air through which electromagnetic radiation propagates from the device to the object point. In one embodiment the phase shift of modulation in light emitted by the laser scanner 20 and the point is determined and evaluated to obtain a measured distance.

The controller 264 may include a processor system that has one or more processing elements. It should be appreciated that while the controller 264 is illustrated as being integral with the housing of the laser scanner 252, in other embodiments, the processor system may be distributed between a local processor, an external computer, and a cloud-based computer. The processors may be microprocessors, field programmable gate arrays (FPGAs), digital signal processors (DSPs), and generally any device capable of performing computing functions. The one or more processors have access to memory for storing information. In an embodiment the controller 264 represents one or more processors distributed throughout the laser scanner 252.

The controller 264 may also include communications circuits, such as an IEEE 802.11 (Wi-Fi) module that allows the controller 264 to communicate through the network connection, such as with a remote computer, a cloud based computer, the 2D scanner 30 or other laser scanners 252.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

The measuring head 254 may include a display device 266 integrated into the laser scanner 252. The display device 266 may include a graphical touch screen, as shown in FIG. 24, which allows the operator to set the parameters or initiate the operation of the laser scanner 252. For example, the screen may have a user interface that allows the operator to provide measurement instructions to the device, and the screen may also display measurement results.

In an embodiment, the base 256 is coupled to a swivel assembly (not shown) such as that described in commonly owned U.S. Pat. No. 8,705,012, which is incorporated by reference herein. The swivel assembly is housed within the carrying structure and includes a motor that is configured to rotate the measuring head 254 about the vertical axis.

In the exemplary embodiment, the base 256 is mounted on a frame 268, such as a tripod for example. The frame 268 may include a movable platform 270 that includes a plurality of wheels 272. As will be described in more detail herein, the movable platform 270 allow the laser scanner 252 to be quickly and easily moved about the environment that is being scanned, typically along a floor that is approximately horizontal. In an embodiment, the wheels 272 may be locked in place using wheel brakes as is known in the art. In another embodiment, the wheels 272 are retractable, enabling the tripod to sit stably on three feet attached to the tripod. In another embodiment, the tripod has no wheels but is simply pushed or pulled along a surface that is approximately horizontal, for example, a floor. In another embodiment, the optional moveable platform 270 is a wheeled cart that may be hand pushed/pulled or motorized.

In this embodiment, the 2D scanner 30 and the laser scanner 252 each have a position indicator 274, 276 respectively. As is discussed in more detail with respect to FIGS. 26, 37 and 38, the position indicators may be a radio frequency identification system (RFID), a near field communications system (FIG. 26), a magnetic switch system (FIG. 37), a feature or keying arrangement or a machine readable indicia system (FIG. 38). The position indicators 274, 276, when engaged, allow the system 250 to determine and record the position of the 2D scanner 30 relative to the laser scanner 252. Once the 2D scanner 30 is registered relative to the laser scanner 252, the 2D coordinate measurement data acquired by the 2D scanner 30 may be transformed from a local coordinate frame of reference to a laser scanner coordinate frame of reference. It should be appreciated that this allows the combining of the coordinate data from the 2D scanner 30 and the laser scanner 252.

Figure 26:
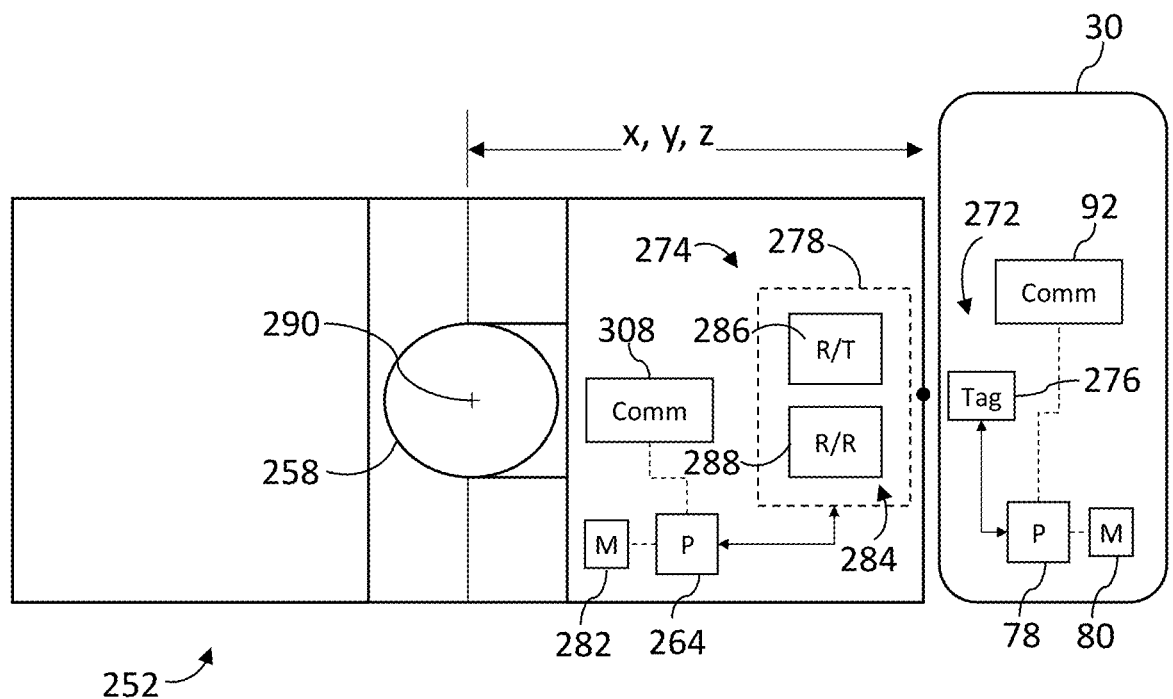
FIG. 26 is a schematic illustration of a laser scanner and hand scanner for the system of FIG. 24.

Referring now to FIG. 26, with continuing reference to FIG. 24 and FIG. 25, an embodiment is shown of the system 250 using near field communications (NFC) for the position indicators 272, 274. A near field communications system typically consists of a tag 276 and a reader 278. The tag 276 and reader 278 are typically coupled to separate devices or objects and when brought within a predetermined distance of each other, cooperate to transfer data therebetween. It should be appreciated that while embodiments herein describe the tag 276 as being mounted within or coupled to the body of the 2D scanner 30 and the reader 278 as being disposed within the housing of the laser scanner 252, this is for exemplary purposes and the claims should not be so limited. In other embodiments, the arrangement of the tag 276 and reader 278 may be reversed.

As used herein, the term "near field communications" refers to a communications system that allows for a wireless communications between two devices over a short or close range, typically less than 5 inches (127 millimeters). NFC further provides advantages in that communications may be established and data exchanged between the NFC tag 276 and the reader 278 without the NFC tag 276 having a power source such as a battery. To provide the electrical power for operation of the NFC tag 276, the reader 278 emits a radio frequency (RF) field (the Operating Field). Once the NFC tag 276 is moved within the operating field, the NFC tag 276 and reader 278 are inductively coupled, causing current flow through an NFC tag antenna. The generation of electrical current via inductive coupling provides the electrical power to operate the NFC tag 276 and establish communication between the tag and reader, such as through load modulation of the Operating Field by the NFC tag 276. The modulation may be direct modulation, frequency-shift keying (FSK) modulation or phase modulation, for example. In one embodiment, the transmission frequency of the communication is 13.56 megahertz with a data rate of 106-424 kilobits per second.

In an embodiment, the 2D scanner 30 includes a position indicator 272 that includes the NFC tag 276. The NFC tag 276 may be coupled at a predetermined location of the body of the 2D scanner 30. In an embodiment, the NFC tag 276 is coupled to the side of the 2D scanner 30 to facilitate the operator 280 placing the NFC tag 276 adjacent the laser scanner 252 (FIG. 26). In an embodiment, the NFC tag 276 is coupled to communicate with the processor 78. In other embodiments, the NFC tag 276 is a passive device that is not electrically coupled to other components of the 2D scanner 30. In the exemplary embodiment, the NFC tag 276 includes data stored thereon, the data may include but is not limited to identification data that allows the 2D scanner 30 to be uniquely identified (e.g. a serial number) or a communications address that allows the laser scanner 252 to connect for communications with the 2D scanner 30.

In one embodiment, the NFC tag 276 includes a logic circuit that may include one or more logical circuits for executing one or more functions or steps in response to a signal from an antenna. It should be appreciated that logic circuit may be any type of circuit (digital or analog) that is capable of performing one or more steps or functions in response to the signal from the antenna. In one embodiment, the logic circuit may further be coupled to one or more tag memory devices configured to store information that may be accessed by logic circuit. NFC tags may be configured to read and write many times from memory (read/write mode) or may be configured to write only once and read many times from tag memory (card emulation mode). For example, where only static instrument configuration data is stored in tag memory, the NFC tag may be configured in card emulation mode to transmit the configuration data in response to the reader 278 being brought within range of the tag antenna.

In addition to the circuits/components discussed above, in one embodiment the NFC tag 276 may also include a power rectifier/regulator circuit, a clock extractor circuit, and a modulator circuit. The operating field induces a small alternating current (AC) in the antenna when the reader 278 is brought within range of the tag 276. The power rectifier and regulator converts the AC to stable DC and uses it to power the NFC tag 276, which immediately "wakes up" or initiates operation. The clock extractor separates the clock pulses from the operating field and uses the pulses to synchronize the logic, memory, and modulator sections of the NFC tag 276 with the NFC reader 278. The logic circuit separates the 1's and 0's from the operating field and compares the data stream with its internal logic to determine what response, if any, is required. If the logic circuit determines that the data stream is valid, it accesses the memory section for stored data. The logic circuit encodes the data using the clock extractor pulses. The encoded data stream is input into the modulator section. The modulator mixes the data stream with the operating field by electronically adjusting the reflectivity of the antenna at the data stream rate. Electronically adjusting the antenna characteristics to reflect RF is referred to as backscatter. Backscatter is a commonly used modulation scheme for modulating data on to an RF carrier. In this method of modulation, the tag coil (load) is shunted depending on the bit sequence received. This in turn modulates the RF carrier amplitude. The NFC reader detects the changes in the modulated carrier and recovers the data.

In an embodiment, the NFC tag 276 is a dual-interface NFC tag, such as M24SR series NFC tags manufactured by ST Microelectronics N.V. for example. A dual-interface memory device includes a wireless port that communicates with an external NFC reader, and a wired port that connects the device with another circuit, such as processor 78. The wired port may be coupled to transmit and receive signals from the processor 78 for example. In another embodiment, the NFC tag 276 is a single port NFC tag, such as MIFARE Classic Series manufactured by NXP Semiconductors. With a single port tag, the tag 276 is not electrically coupled to the processor 78.

It should be appreciated that while embodiments herein disclose the operation of the NFC tag 276 in a passive mode, meaning an initiator/reader device provides an operating field and the NFC tag 276 responds by modulating the existing field, this is for exemplary purposes and the claimed invention should not be so limited. In other embodiments, the NFC tag 276 may operate in an active mode, meaning that the NFC tag 276 and the reader 278 may each generate their own operating field. In an active mode, communication is performed by the NFC tag 276 and reader 278 alternately generating an operating field. When one of the NFC tag and reader device is waiting for data, its operating field is deactivated. In an active mode of operation, both the NFC tag and the reader device may have its own power supply.

In an embodiment, the reader 278 is disposed within the housing of the laser scanner 252. The reader 278 includes, or is coupled to a processor, such as processor 264 coupled to one or more memory modules 282. The processor 264 may include one or more logical circuits for executing computer instructions. Coupled to the processor 560 is an NFC radio 284. The NFC radio 284 includes a transmitter 286 that transmits an RF field (the operating field) that induces electric current in the NFC tag 276. Where the NFC tag 276 operates in a read/write mode, the transmitter 286 may be configured to transmit signals, such as commands or data for example, to the NFC tag 276.

The NFC radio 284 may further include a receiver 288. The receiver 288 is configured to receive signals from, or detect load modulation of, the operating field by the NFC tag 276 and to transmit signals to the processor 264. Further, while the transmitter 286 and receiver 288 are illustrated as separate circuits, this is for exemplary purposes and the claimed invention should not be so limited. In other embodiments, the transmitter 286 and receiver 284 may be integrated into a single module. The antennas being configured to transmit and receive signals in the 13.56 megahertz frequency.

As is discussed in more detail herein, when the 2D scanner 30 is positioned relative to the laser scanner 252, the tag 276 may be activated by the reader 278. Thus the position of the 2D scanner 30 relative to the laser scanner 252 will be generally known due to the short transmission distances provided by NFC. It should be appreciated that since the position of the tag 276 is known, and the position of the reader 278 is known, this allows the transforming of coordinates in the 2D scanner coordinate frame of reference into the laser scanner coordinate frame of reference (e.g. the reference frame having an origin at the gimbal location 290).

Terms such as processor, controller, computer, DSP, FPGA are understood in this document to mean a computing device that may be located within the system 30 instrument, distributed in multiple elements throughout the system, or placed external to the system (e.g. a mobile computing device).

Figure 27:
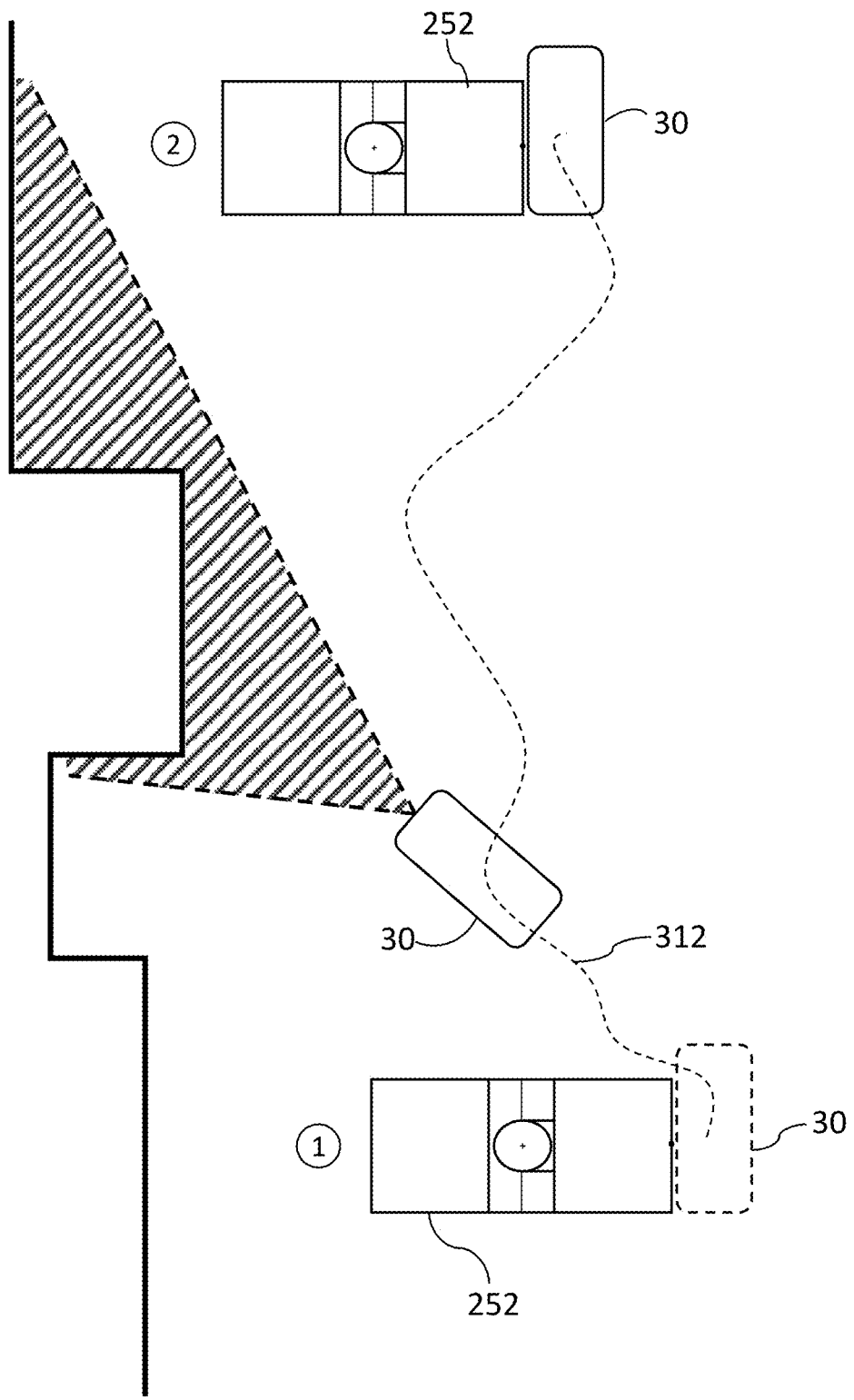
FIG. 27 is a schematic illustration of the operation of the system of FIG. 24.
Figure 28:
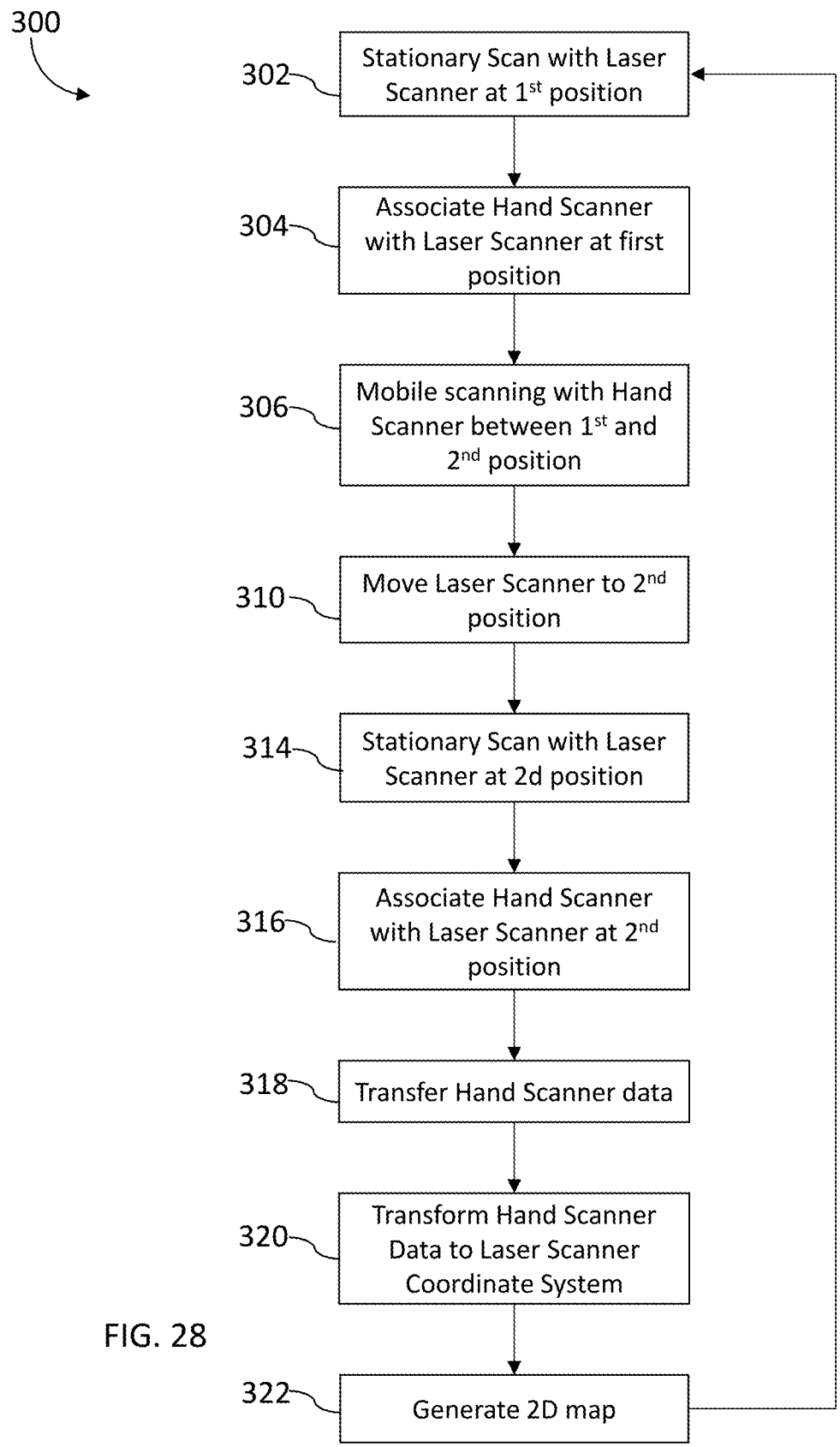
FIG. 28 is a flow diagram of a method of operating the system of FIG. 24.

Referring now to FIGS. 27-28, with continuing reference to FIGS. 24-26, a method 300 is shown of the operation of the system 250. The method 300 begins in block 302 with the laser scanner 252 performing a scan at a first position. During the scan at the first position (location "1" of FIG. 27), the laser scanner 252 acquires 3D coordinates for a first plurality of points on surfaces in the environment being scanned. The method 300 then proceeds to block 304 where the 2D scanner 30 is moved adjacent the laser scanner 252 such that the position indicator 272 engages the position indicator 274. In the embodiment of FIG. 26, the placement of the tag 276 within range of the reader 278 allows data to be transferred from the 2D scanner 30 to the laser scanner 252. In an embodiment, the transferred data includes an identification data of the 2D scanner 30. This registers the position and orientation of the 2D scanner 30 relative to the laser scanner 252 at the first position. Once the 2D scanner 30 is registered to the laser scanner 252, the method 300 then proceeds to block 306 where the 2D scanner 30 is activates. In one embodiment, the 2D scanner 30 is automatically activated by the registration, such as via a signal from the laser scanner communications circuit 308 to the 2D scanner communications circuit 92 or via NFC. In an embodiment, the 2D scanner 30 continuously scans until the laser scanner 252 and the 2D scanner 30 are registered a second time.

In block 306, the operator 280 scans the environment by moving the 2D scanner 30 along a path 312. The 2D scanner acquires 2D coordinate data of the environment as it is moved along the path 312 in the manner described herein with respect to FIGS. 11-13 with the movement of the 2D scanner being determined based on IMU 74 (FIG. 10). It should be appreciated that the 2D coordinate data is generated in a local coordinate frame of reference of the 2D scanner 30.

The method 300 then proceeds to block 310 where the laser scanner 252 is moved from the first position to a second position (e.g. location "2" of FIG. 27). The method 300 then proceeds to block 314 where a second scan of the environment is performed by the laser scanner 252 to acquire the 3D coordinates of a second plurality of points on surfaces in the environment being scanned. Based at least in part on the first plurality of points acquired in the first scan by laser scanner 252 in block 302 and the second plurality of points acquired in the second scan by laser scanner 252 in block 314, a correspondence between registration targets may be determined. In the exemplary embodiment, the registration targets are based on natural features in the environment that are common to both the first and second plurality of points. In other embodiments, artificial targets may be manually placed in the environment for use in registration. In an embodiment, a combination of natural features and artificial targets are used for registration targets.

It should be appreciated that once the registration targets are identified, the location of the laser scanner 252 (and the origin of the laser scanner frame of reference, e.g. gimbal point 290) in the second position relative to the first position is known with a high level of accuracy. In an embodiment, the accuracy of the laser scanner 252 between the first position and the second position may be between 1 mm-6 cm depending on the environment. In an embodiment, a registered 3D collection of points is generated based on a correspondence among registration targets, the 3D coordinates of the first collection of points, and the 3D coordinates of the second collection of points.

The method 300 then proceeds to block 316 where the 2D scanner 30 is once again moved adjacent the laser scanner 252 (now in the second position) to engage the position indicator 272 and position indicator 274. The engagement of the position indicators 272, 274, registers the position and orientation of the 2D scanner 30 relative to the laser scanner 252. In an embodiment, this second registration of the 2D scanner 30 causes the 2D scanner 30 to stop scanning. In an embodiment, blocks 314, 316 are reversed and the registration of the 2D scanner 30 causes the laser scanner to automatically perform the second scan of block 314.

With the 2D scanner 30 registered, the method 300 then proceeds to block 318 where the 2D coordinate data acquired by 2D scanner 30 is transferred. In an embodiment, the 2D coordinate data is transferred. In one embodiment, the 2D coordinate data is transferred to the laser scanner 30. In another embodiment, the 2D coordinate data is transferred to one or more external or remotely located computers along with the registered 3D collection of points.

The method 300 then proceeds to block 320 where the transferred 2D coordinate data is transformed from the 2D scanner local coordinate frame of reference to the laser scanner coordinate frame of reference. It should be appreciated that with the 2D coordinate data in the laser scanner coordinate frame of reference, the 2D coordinate data may be adjusted as the initial position (e.g. the first position of laser scanner 252) and the final position (e.g. the second position of laser scanner 252) are known with a high degree of accuracy. This provides advantages in improving the accuracy of the 2D coordinate data with the flexibility of a hand held 2D scanner.

With the 2D coordinate data transformed into the laser scanner coordinate frame of reference, the method 300 then proceeds to block 322 where a 2D map of the environment is generated based at least in part on the transformed 2D coordinate data and the registered 3D collection of points. It should be appreciated that in some embodiments, the method 300 may then loop back to block 306 and additional scanning is performed. The scan performed by the laser scanner at the second position then becomes the effective first position for the subsequent execution of method 300. It should further be appreciated that while the method 300 is shown as a series of sequential steps, in other embodiments, some of the blocks of method 300 may be performed in parallel.

Accordingly, the system 250 continuously creates a 2D map of the environment. Based on the incoming data of the laser scanner 252 or of the 2D scanner 50 and the IMU 74, the system 250 builds a 2D map of the environment that has the information about its position at any time. However, in some cases due to erroneous readings from the laser scanner 252 or due to errors in the mapping algorithm itself, some areas of the 2D map might appear wrongly mapped. While for some applications these errors are minimal and do not affect the user application, in most of the cases it is important to build accurate and visually appealing 2D maps. Post-processing algorithms fail to identify such errors in the map generation because of the lack of data and the variety of building configurations that may be scanned using the system 250. The one or more embodiments of the technical solutions described herein address such technical challenges of erroneous 2D map generation. The embodiments provide a graphical-based 2D map editor tool that facilitates a user to move parts of the 2D map, rotate or even delete one or more parts.

Figure 29:
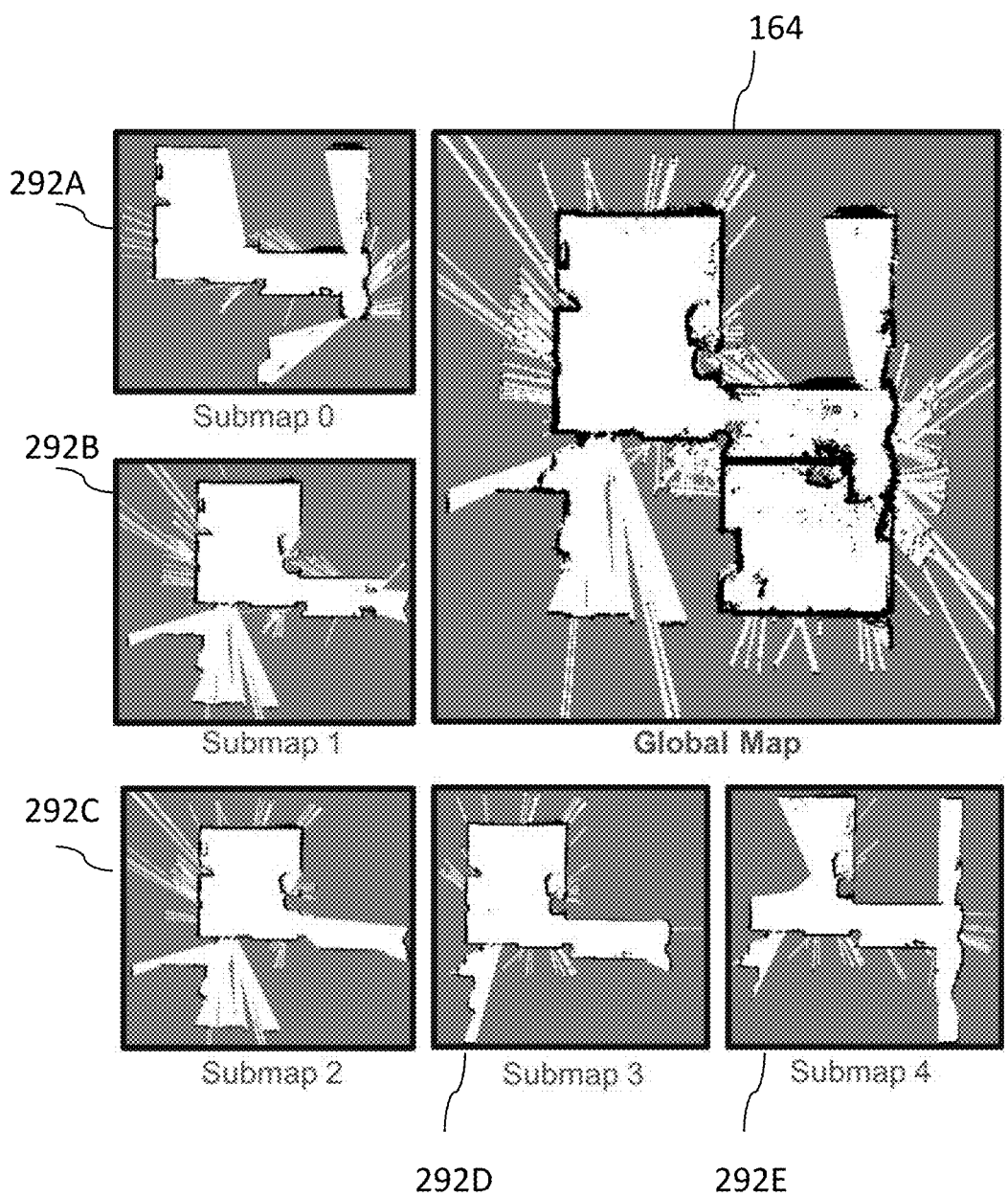
FIG. 29 depicts an example 2D map generation according to one or more embodiments.

FIG. 29 depicts an example 2D map generation according to one or more embodiments. The 2D map 164 ('global' map) that is generated using one or more submaps 292A-292E. Each submap 292A-292E is a set of 2D coordinates of points on the object surface collected as the 2D scanner 50 moves from the first registration position 104 to a second registration position 106 (or locations depicted in FIG. 27). Each of the plurality of 2D submaps 292A-292E may be collected by the 2D scanner 50 at a different position relative to the first registration position 104 or at different orientation/pose in the first registration position 104.

Referring back to FIGS. 11-13, the 2D scanner 50 collects the 2D scan data for the submaps 292A-E starting at the first position 104, at the second position 106, and at intermediate scan positions 108. In an embodiment, the 2D scan data is collected and processed at regular intervals, for example, once per second. In this way, features in the environment are identified in successive 2D scans at positions 108. In an embodiment, when more than two 2D scans are obtained, the controller 86 may use the information from all the successive 2D scans in determining the translation and rotation values in moving from the first position 104 to the second position 106. The submaps 292A-292E that are generated for each position 108 are combined to generate a 'global' 2D map 164, which may then be annotated as described herein. The submaps 292A-292E are saved or stored in memory by the 2D scanner 50 on a periodic or aperiodic basis. In the exemplary embodiment, each submap is defined by a predetermined number of acquired 3D coordinate data points. In other embodiments, the 2D scanner 50 may acquire 3D coordinate data points for a predetermined amount of time before storing a submap. In an embodiment, the predetermined number of 3D coordinate data points that are acquired for each submap is user define-able. In an embodiment if the operator stops scanning, the data acquired up until the point of ceasing the scanning is stored in a submap, even if the predetermined number of 3D coordinate data points have not been acquired.

In an embodiment, the system 250, using device 30, is used to collect a first submap 292A at the first registration point 104. The first translation value, the second translation value, and the first rotation value are the same for the 2D scanner 50, the laser scanner 252, and the system 250 since all are fixed relative to each other. In another embodiment, the 2D scanner 50 may be operated by itself and the position and pose of the 2D scanner 50 is determined using the feature recognition methods disclosed herein, the IMU 72, or a combination of the foregoing.

In an embodiment, the 2D map generation using the submaps 292A-E includes determining, in cooperation with the laser scanner 252, coordinates of a second collection of points on the object surface while the system 250 is fixedly located at the second registration position 106. The processor identifies a correspondence among registration targets present in both the first collection of points and the second collection of points, the correspondence based at least in part on the first translation value, the second translation value, and the first rotation value.

The system 250 is moved to the second registration position 106 to collect another submap 292B. It should be noted that the laser scanner 252 can stay in a fixed position, while the system 30 goes around and builds a set of submaps. In an embodiment, the system 250 is brought to a stop and brakes (such as wheel brakes 41 for example) are locked to hold the system 30 stationary. In another embodiment, the processor system 78 starts the laser scanner 252 automatically when the moveable platform is brought to a stop, for example, by the position/orientation sensor 106 determining the lack of movement. The laser scanner 252 of system 250 scans the object 112 to obtain coordinate data. This scan is referred to as the second laser scan to distinguish it from the first laser scan performed at the first registration position 104.

Figure 30:
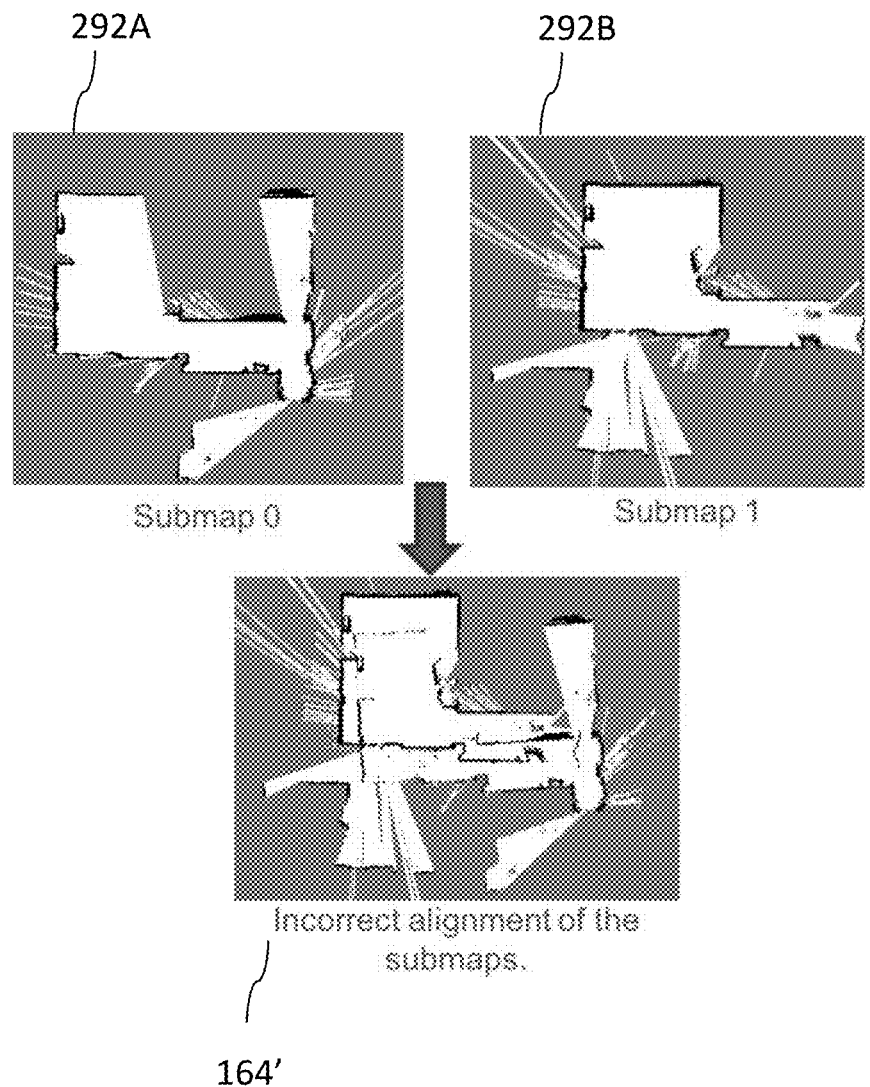
FIG. 30 depicts an example of an error in registration, which results in an incorrect 2D map being generated because of misalignment of the submaps.

These stored 2D coordinates may then be used to generate the global 2D map 164 of the area being scanned, such as that shown in FIG. 29. In the exemplary embodiment, the generation of the global 2D map is performed using simultaneous localization and mapping. In an embodiment, the simultaneous localization and mapping process uses sparse information matrices produced by generating a factor graph of observation interdependencies (two observations are related if they contain data about the same feature). During the scanning process, there is a potential for errors to occur in the registration of the 2D collection of points. These errors may occur, for example, if a natural feature used in the registration process is moved (e.g. a door is opened). Another type of registration error is sometimes referred to as a "loop." In this type of error, the operator moves the system through the environment in a closed loop path, in other words the beginning and the end of the scan occur at the same location. As errors accumulate during the scanning process, the location of the end point (in the scan data) may not coincide with the start point. When an error in the registration occurs the graphical representation (e.g. the 2D map) of the points in the 2D collection of points that are acquired after the error in registration occurs may not be properly aligned (x or y shifted) or oriented (yaw) relative to the earlier acquired points. An example of an error in registration is shown in FIG. 30 which results in an incorrect 2D map 164' being generated because of misalignment of the submaps 292A-B. It should be appreciated that it is desirable to be able to adjust the 2D collection of points and the 2D map to correct for the error.

Figure 31:
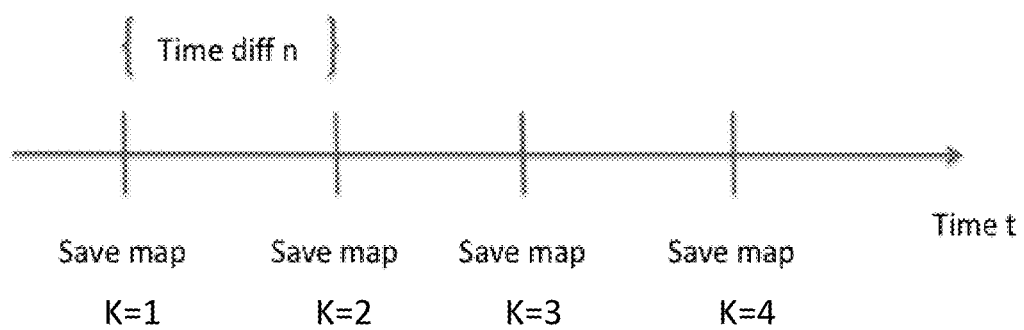
FIG. 31 depicts a collection of submaps over time according to one or more embodiments.

In accordance with an embodiment, the system 30 is configured to periodically store the 2D submaps including the collection of points in memory such that the submaps 292A-E may be later recalled. As shown in FIG. 31, the collection of the 2D submaps may be performed over the course of time T. At predetermined time periods, a submap "K" of the 2D collection of points is stored. It should be appreciated that each submap K represents a scan performed during a particular time period. When a submap K is stored, the subsequent submap K+1 starts from the point where the submap K was stored. Due to the unstructured or ad-hoc nature of the path the operator takes while scanning, submaps may include 3D coordinate points that overlap or are duplicates of other submaps.

Figure 32:
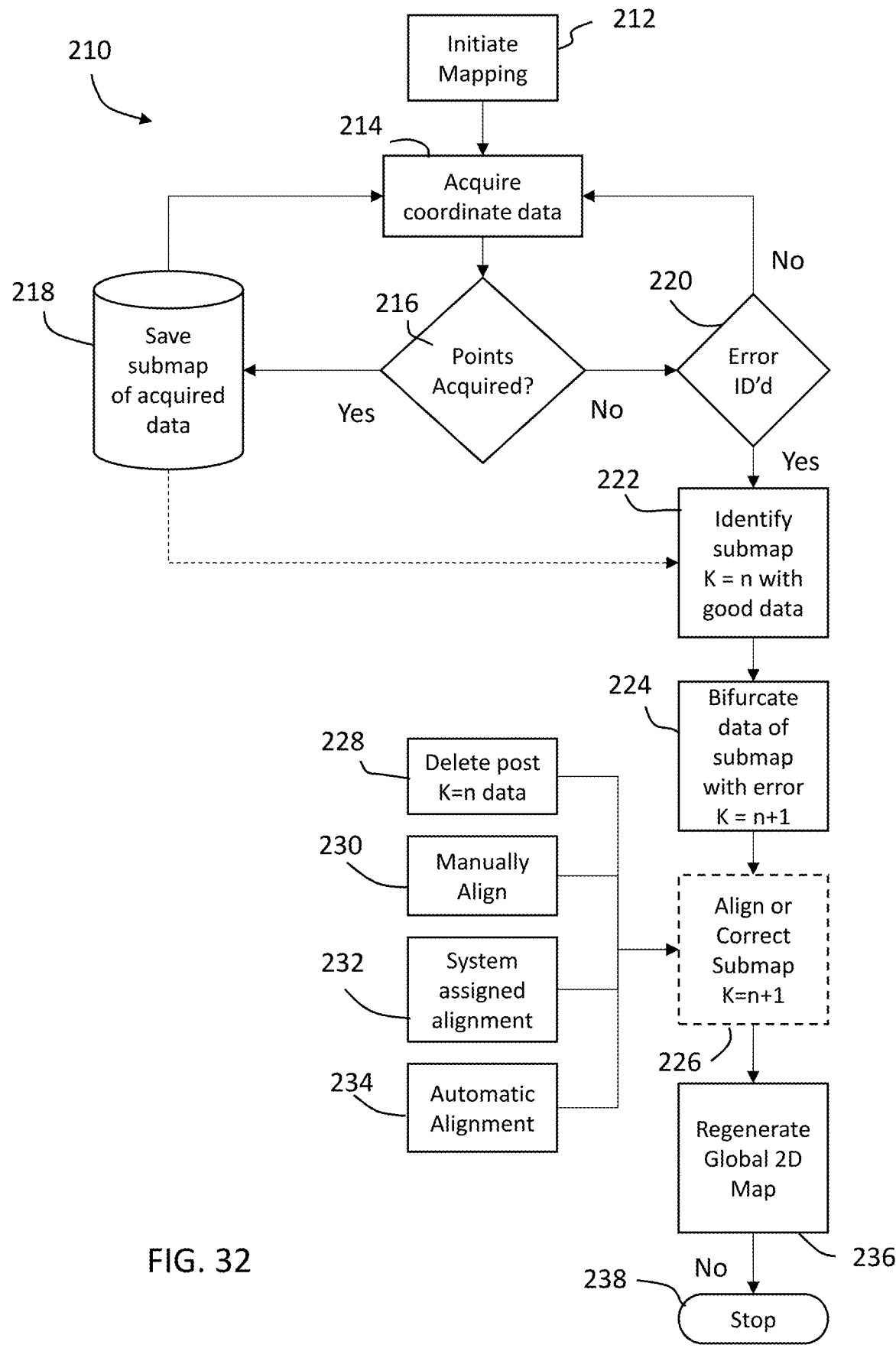
FIG. 32 depicts a flowchart for a method of correcting the 2D collection of points after an error in registration has occurred according to one or more embodiments.
Figure 33:
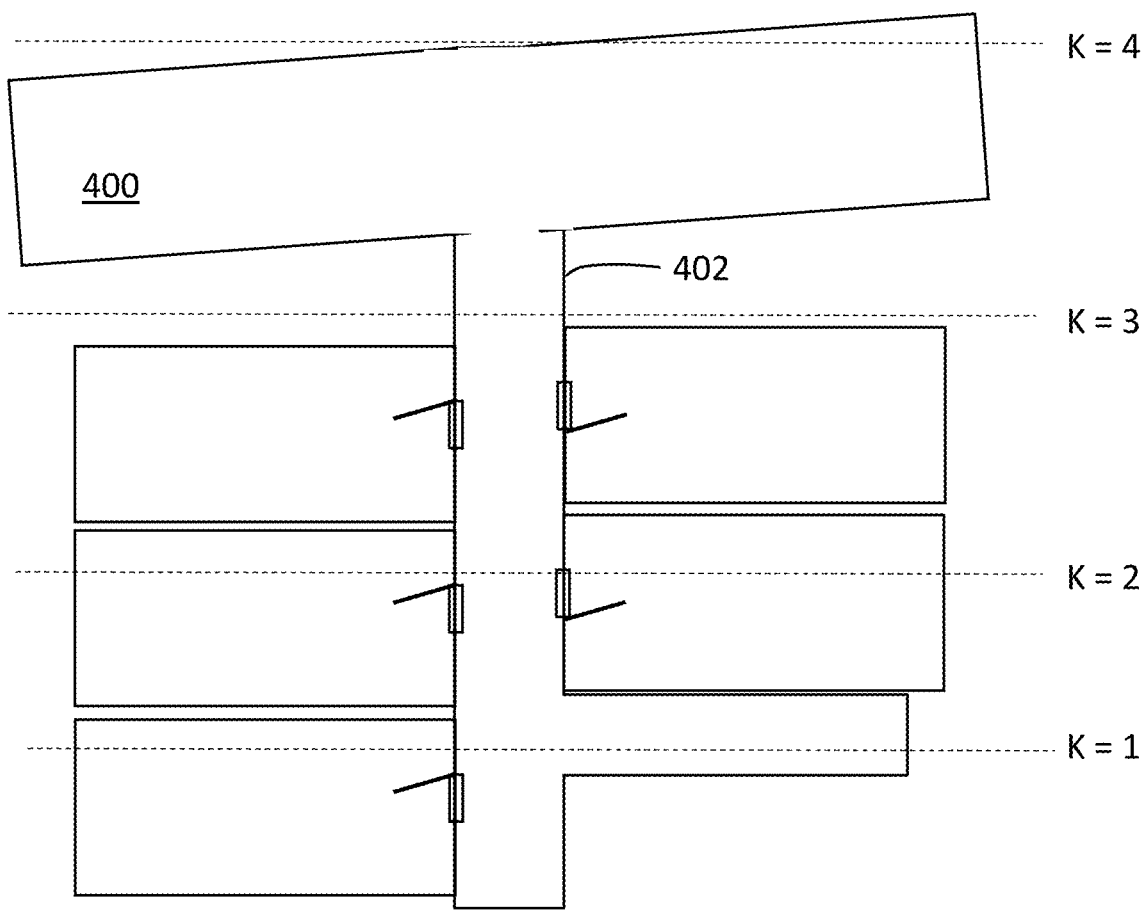
FIGS. 33-35 depict an example scenario of editing a 2D map by editing one or more submaps according to one or more embodiments.
Figure 34:
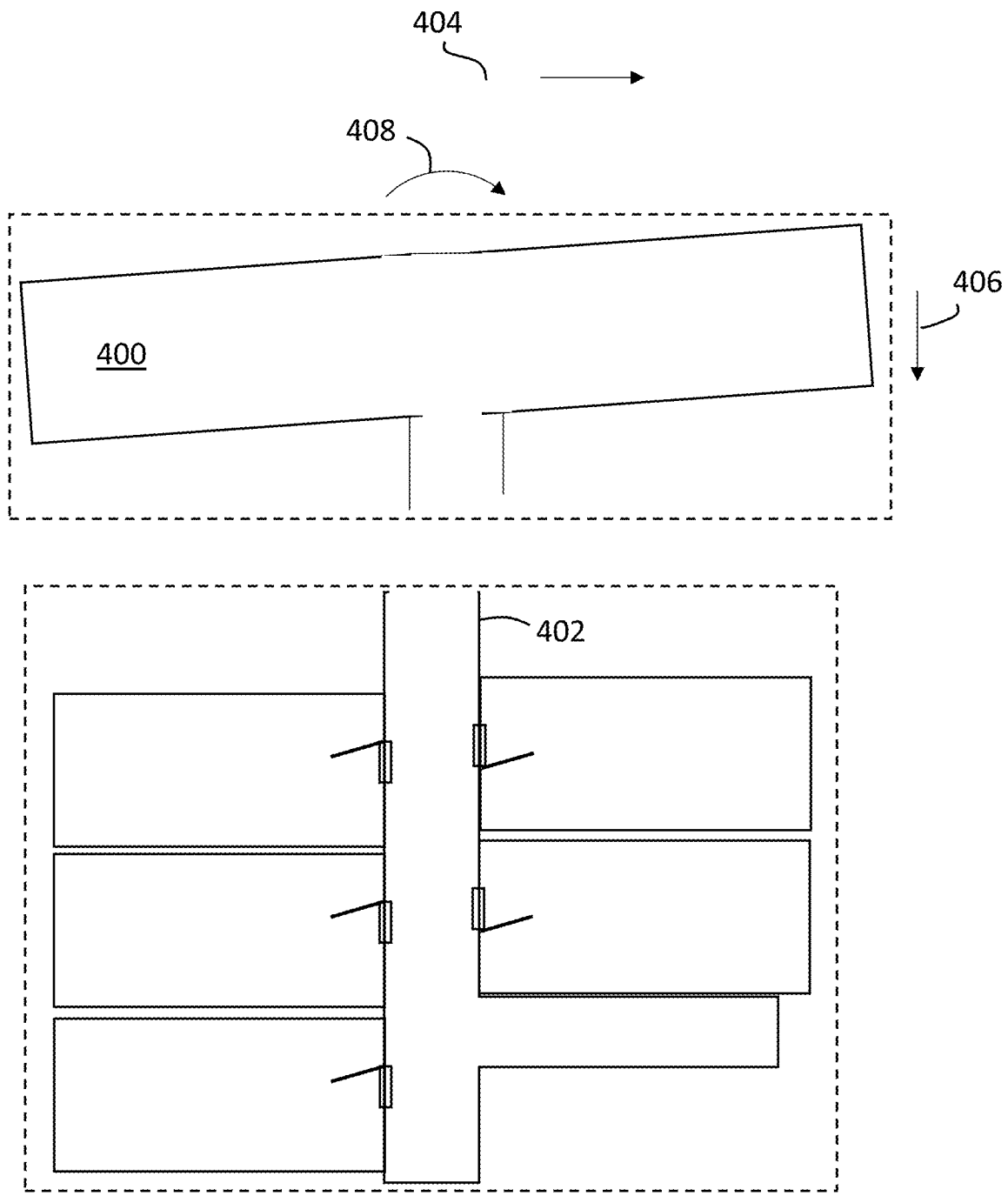
Figure 35:
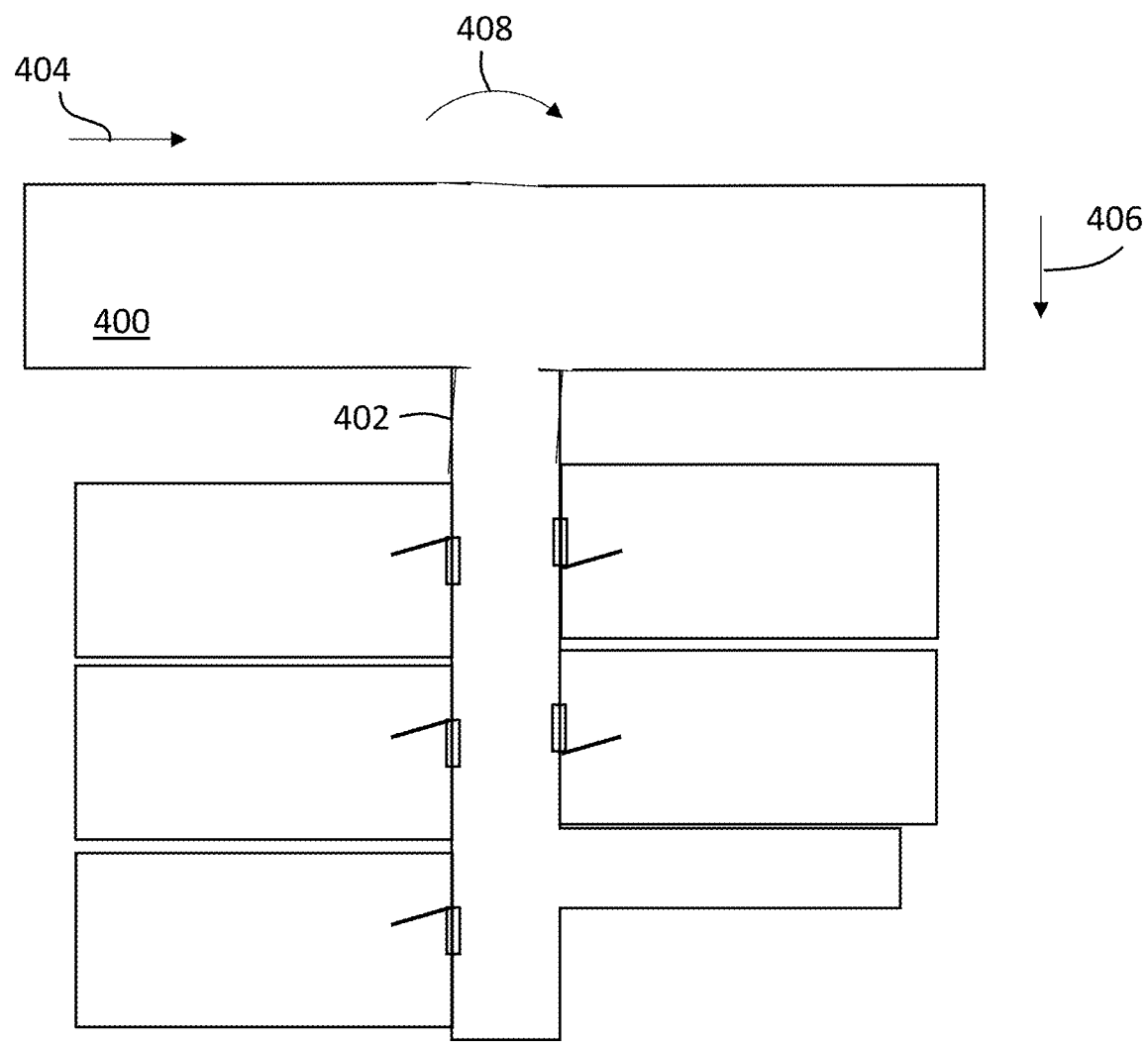

Referring now to FIG. 32, a method 210 is shown for correcting the 2D collection of points after an error in registration has occurred. An example scenario is also depicted in FIGS. 33-35 to describe one or more operations of the method 210. An example of an error in registration is shown in FIG. 33 that resulted in a room 400 being on an angle relative to the adjacent hallway 402.

The method 210 starts in block 212 where mapping/scanning is initiated. The method 210 then proceeds to block 214 where coordinate data for the points in the area being scanned are acquired. In an embodiment, a submap "K" is generated by scanning the corresponding data. The method 210 then proceeds to query block 216 where it is determined if the predetermined number of 3D coordinate data points have been acquired. When query block 216 returns a positive, the method 210 proceeds to block 218 where the submap "K" is saved to memory and the method loops back to block 214 and data points for a new submap are acquired.

When query block 216 returns a negative, the method 210 proceeds to query block 220 where it is determined if an error in the registration has been identified. When the query block 216 returns a negative, the method 210 loops back to block 214 and continues to acquire further coordinate data. When the query block 220 returns a positive, meaning an error has been identified, the method 210 proceeds to block 222. In an embodiment, the identification of the registration error may be determined visually by the operator. In other embodiments, the detection of the registration error may be automated, for example by comparing the 2D map with a previous map of the area. For example, in an embodiment where the 2D map is being made of a building interior, the 2D map may be compared with the design layout drawings (e.g. blueprints) for the building. When the 2D map deviates from the design layout greater than a threshold, a signal may be generated that notifies the operator.

In block 222, the submap "K=n" with the last known correct data (e.g. data without registration errors) is identified from the saved submap data. In the example of FIG. 33, four submaps, K=1, K=2, K=3 and K=4 were acquired during the scan. It was identified that the data for room 400 is mis-registered relative to the hallway 402. Since the hallway 402 appears to be correct, the submap K=3 is determined to be the last submap with the correct data. The method 210 then proceeds to block 224 where the coordinate data in the 2D collection of points from submap K=3 is bifurcated or separated from the data.

The method 210 then proceeds to block 226 where the data with no registration errors (e.g. submap K=3) is corrected. In an embodiment, the alignment is performed by deleting (block 228) submap with the misalignment. This may be done, for example, if the submaps before and after (e.g. submap K=2 and K=4) include sufficient data of the area covered by submap K=3. It should be appreciated that in an embodiment where the mis-registered portion of the data is deleted, the deleted data set may be replaced by a submap with known correct data may be recalled and used to replace the current data set. For example, by correcting the orientation of one the submaps (K=3), the operator is able to improve the quality of the 2D map without performing the mapping task all over again. The embodiment facilitates the operator to load the submaps and apply the desired modifications according to its needs as well as revert them at any time, i.e., after a month of the creation of the 2D map, the operator still can modify the 2D map or even create smaller parts of the 2D map whenever needed. This facilitates the operator to create smaller 2D maps that are more focused in specific areas such as rooms, or hallways.

In another embodiment, the operator may manually realign the data to correct for the erroneous shift (x or y) or orientation (yaw) in the data. As illustrated in FIG. 34, the data acquired after submap K=3 is bifurcated or separated from the earlier 2D collection of points. The operator may then move (as indicated by the arrows 404, 406) and rotate (as indicated by the arrow 408) until the two data sets are aligned as shown in FIG. 35.

In another embodiment of block 232, the operator adjusts the position and orientation of the second data set, meaning the data acquired after the last known submap with correct data. In this embodiment, the method 210 identifies natural features in the 2D map, such as corners of hallways, posts or columns for example, that overlap with the second data set. When the operator adjusts the position and orientation of the later data relative to the earlier data, the method 210 snaps or automatically positions the later data based on the natural features being aligned within a predetermined threshold.

In still another embodiment of block 234, the alignment of the second data set is automatically aligned. In this embodiment the geometrical structure of the submap data set is matched against second data set until an overlay is reached within a predetermined probability threshold. In this embodiment a line matching methodology such as Iterative Closest Point (ICP) for example, may be used for the alignment of the data sets. Once the 2D map of the second data set is in the correct position the offset vector from the previous map origin to the new map origin is determined in the coordinate system of the previous map. This vector will be automatically applied to all positions in the new map. This process may be repeated n times. At the end a correct complete map is generated consisting of the single maps in the coordinate system of the original coordinate system.

Once the data set for the 2D collection of points from the submap with the registration error (e.g. submap K=3) is aligned, the method 210 proceeds to query block 236 where the 2D global map 164 is regenerated using the aligned submap K=3. It should be appreciated that by correcting the mis-aligned submap, the global 2D map generated from the subsequent submaps will more accurately represent the scanned space. The method 210 then proceeds to block 238 and stops.

It should be appreciated that while embodiments herein describe the system and method for aligning mis-registered 2D data, this is for exemplary purposes and the claimed invention should not be so limited. For example, in other embodiments, the laser scanner 252 acquires 3D data, and the 2D map may be generated from the 3D data. In other embodiments, data sets consisting of 3D collection of points may be registered and aligned as described herein.

Further, while embodiments herein describe the acquisition of the coordinate data with the 2D scanner 50, this is for exemplary purposes and the claims should not be so limited. In other embodiments, the methods described herein may be performed on data acquired by any suitable scanning device, such as but not limited to a laser scanner, a time-of-flight scanner, a laser tracker, an articulated arm coordinate measurement machine, an image scanner, a structured light scanner or a triangulation scanner.

Further, it should be noted that the embodiments facilitate the operator to edit, for example, rotate, translate, delete, and the like, a selected submap from the saved submaps 292A-E via a 2D map editor in an offline manner.

Figure 36:
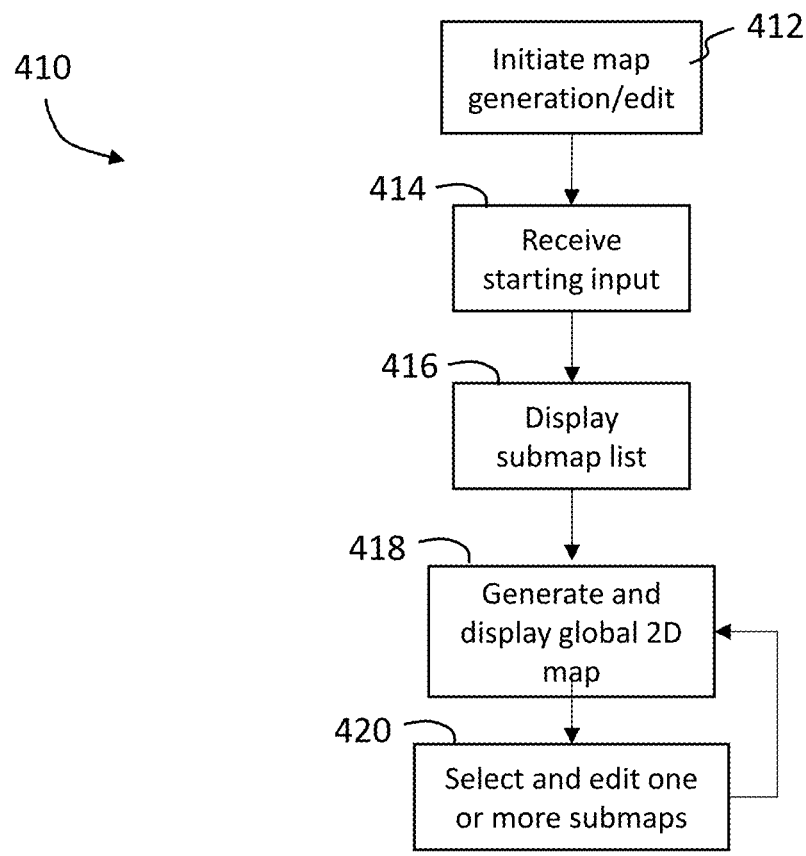
FIG. 36 depicts a flowchart for an example method 410 of generating and editing a 2D map of an environment according to one or more embodiments.

FIG. 36 depicts a flowchart for an example method 410 of generating and editing a 2D map of an environment according to one or more embodiments. The method may be initiated after the set of submaps 292A-E of the environment have been captured, in block 412. The method can be used to generate the 2D map 164 (or 166) and/or edit an existing 2D map 164 (or 166). It should be noted that in one or more examples, the method 410 can facilitate the operator to add/edit the annotations of the 2D map 164. The method 410 includes receiving a starting input from the operator at block 414. The input can include the operator providing a list of the submaps 292A-E that are to be combined to generate the 2D map 164. Alternatively, or additionally, the input includes the operator selecting the 2D map 164 to be edited by the map editor. The map editor is a software tool that the operator can access via the user interface of the system 250 and/or a separate computer system, such as a desktop computer, a laptop computer, a tablet computer, a smartphone, or any other computing device. In case the 2D map 164 is selected, the map editor determines the submaps 292A-E that were used to compose the 2D map 164.

The method 410 includes displaying a list of the submaps 292A-E at block 416. Further, the map editor displays the 2D map (global map) 164 that is generated by combining the list of submaps 292A-E, at 418. (e.g., see FIG. 29). The 2D map 164 is generated as described herein.

The method 410 further includes selecting one or more of the submaps 292A-E by the operator that are being used to generate the 2D map 164 and editing the selected submaps, at 420. For example, the editing can include aligning a submap, say the submap 292A with other submaps (e.g. 292B) to correct the generated global 2D map 164 without rescanning. For aligning a submap, for example, the operator can apply translations via the map editor by moving one or more selected submaps 292A-E along the X and Y axis (404/406). In one or more examples, the map editor can be used to rotate (408) the submaps 292A-E by selecting a specific angle.

Further, in one or more examples, the map editor can be used to delete one or more submaps 292A-E by removing the submap from the list. This facilitates the operator to generate a new global 2D map of a part of the environment that was depicted in the 2D map 164. For example, referring to FIGS. 33-35, the operator can load the 2D map 164 of the rooms 402 and the hallway 400, and remove one or more submaps associated with one of the rooms 402 (or any other region of the environment) to generate, in an offline manner, a new 2D map that only includes the hallway. It should be noted that the operator may remove the submap after alignment is performed.

In addition, the operator can add a new submap to the list, For example, by loading a submap from storage. For example, referring to the FIGS. 33-35, the operator may add a submap of a new room or a different instance of the submap 404 of the rooms to the existing list of submaps 292A-E. The revised 2D map that is subsequently generated uses the new submap. For example, in the case of the new submap for an additional room, the revised 2D map now includes the additional room. This can be used by architects or other users to create new 2D maps virtually. Alternatively, in the case where a different instance of a submap is added, the operator can edit the newly added submap to improve the global map 164. In such cases, the newly added submap can replace one of the existing submaps.

Then, taking into account all the new relative poses given to the edited submaps, a new (revised) 2D global map 164 of the environment is computed, at block 418. In one or more examples, the operator may save a copy of the edited submap(s), or overwrite the submap with the edits. The edited submap is then used to generate the global map 164 in combination with other submaps 292A-E.

This approach allows a one-step editing of the 2D floor plans after capturing the 2D submaps, followed by continuously correcting the submaps during the mapping process. Consequently, such offline correction and use of the submaps without remapping and rescanning the area also facilitates automatic loop closing algorithms to be performed on enhanced (corrected) data.

The one or more embodiments of the present invention described herein facilitate an operator to use a graphical-based 2D map editor to move parts of a 2D map, rotate or even delete them. The 2D map that is edited is a graph-like representation of an environment that is scanned and captured by a point scanner system. In the 2D map that is edited each node is a submap or a portion of the 2D map, each submap including point data collected from corresponding registration point. However, due to erroneous readings from one or more components, such as a laser range finder or due to errors in the mapping algorithm itself, some areas of the 2D map can appear wrongly mapped. The embodiments described herein facilitate correcting such errors by enabling the operator to edit a saved submap in an offline manner without requiring rescanning/remapping of the point data.

The one or more embodiments also facilitate an operator to load saved submaps and apply a desired modifications in an offline manner e.g., after a month of the creation of the 2D map, and generate a new 2D map. Further, in one or more examples, the operator may create smaller parts of the 2D map in an offline manner using a subset of the submaps.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system of generating a two-dimensional (2D) image of an environment, the system comprising:
   a 2D scanner having a controller that determines a distance value to at least one object point from a plurality of object points;
   one or more processors operably coupled to the 2D scanner, the one or more processors being responsive to nontransitory executable instructions for generating a plurality of 2D submaps of the environment based at least in part on the distance value, each submap generated from a different point in the environment, the plurality of 2D submaps including a first submap, a second submap and a third submap; and
   a map editor configured to determine an error in the registration of the second submap and in response performing a correction method comprising:
      identifying the first submap has correctly registered data;
      bifurcating the second submap from the first submap and the second submap;

aligning the second submap with the first submap and third submap; and generating the 2D image of the environment using the subset plurality of 2D submaps.

2. The system of claim 1, wherein the map editor is further configured to:
  select the first submap from the plurality of 2D submaps;
  edit the first submap; and
  generate a revised 2D image of the environment using the edited first submap.

3. The system of claim 2, wherein the editing comprises at least one from a group of rotation and translation.

4. The system of claim 2, wherein the editing comprises aligning the first submap to the 2D image of the environment, the alignment comprising:
  performing by an operator at least one of a shift or a rotation of the first submap relative to the 2D image;
  identifying overlapping natural features in the 2D image and the first submap; and
  automatically shifting and rotating the first submap to align with the 2D image when the overlapping natural features are aligned by the operator within a predetermined threshold.

5. The system of claim 1, wherein the map editor is further configured to:
  select the first submap from the plurality of 2D submaps;
  delete the first submap; and
  generate a revised 2D image of the environment using the plurality of 2D submaps, without the first submap.

6. The system of claim 1, wherein the map editor is further configured to:
  add a new submap to the plurality of 2D submaps; and
  generate a revised 2D image of the environment using the plurality of 2D submaps, with the new submap.

7. The system of claim 1, wherein the map editor is further configured to save a copy of the revised 2D image of the environment separate from the 2D image of the environment.

8. The system of claim 7, wherein the revised 2D image of the environment is for a subset of regions from the 2D image of the environment.

9. A method of generating a two-dimensional (2D) image of an environment, the method comprising:
  moving a 2D measurement device through an environment to acquire a predetermined amount of coordinate data;
  generating a plurality of submaps in response to each acquisition of the predetermined amount of coordinate data, the plurality of submaps including a first submap, a second submap and a third submap;
  determining an error in the registration of the second submap and in response performing a correction method comprising:
    identifying the first submap has correctly registered data;
    bifurcating the second submap from the first submap and the second submap;
    aligning the second submap with the first submap and third submap; and
    generating a 2D map of a scanned environment.

10. The method of claim 9, wherein the identifying of the error in registration is based at least in part on a visual identification by an operator.

11. The method of claim 9, wherein the identifying of the error in registration is based at least in part on a comparison of the plurality of submaps with a previous 2D map of the environment.

12. The method of claim 9, wherein the identifying of the error in registration is based at least in part on a comparison of the plurality of submaps with a design layout drawing.

13. The method of claim 9, wherein the aligning of the second submap includes deleting the second submap and aligning the first submap to the third submap.

14. The method of claim 9, wherein the aligning of the second submap includes deleting the second submap and replacing it with a fourth submap that covers an area of the environment covered by the second submap.

15. The method of claim 9, wherein the aligning of the second submap includes deleting the second submap and replacing it with a fourth submap that was previously generated and covers an area of the environment covered by the second submap.

16. The method of claim 9, wherein the aligning of the second submap includes the operator manually aligning the second submap with the first submap and the third submap.

17. The method of claim 9, wherein the aligning of the second submap is based at least in part on aligning natural features located within the environment.

18. The method of claim 9, wherein the aligning of the second submap is performed automatically by line matching within a predetermined probability threshold.

19. The method of claim 18, wherein the automatic alignment is an iterative closest point matching.

* * * * *